US007158187B2

(12) United States Patent
Suzuki

(10) Patent No.: US 7,158,187 B2
(45) Date of Patent: Jan. 2, 2007

(54) AUDIO VIDEO REPRODUCTION APPARATUS, AUDIO VIDEO REPRODUCTION METHOD, PROGRAM, AND MEDIUM

(75) Inventor: Ryoji Suzuki, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 466 days.

(21) Appl. No.: 10/451,876

(22) PCT Filed: Oct. 17, 2002

(86) PCT No.: PCT/JP02/10778

§ 371 (c)(1),
(2), (4) Date: Dec. 12, 2003

(87) PCT Pub. No.: WO03/034725

PCT Pub. Date: Apr. 24, 2003

(65) Prior Publication Data

US 2004/0105660 A1    Jun. 3, 2004

(30) Foreign Application Priority Data

Oct. 18, 2001  (JP)  ............................. 2001-320167

(51) Int. Cl.
*H04N 9/475* (2006.01)
(52) U.S. Cl. .................................................. 348/515
(58) Field of Classification Search ................ 348/515, 348/512, 517, 525, 390.1; 386/46, 95, 96
See application file for complete search history.

(56) References Cited

U.S. PATENT DOCUMENTS

| 5,341,432 | A | 8/1994 | Suzuki et al. | |
| 5,467,139 | A | 11/1995 | Lankford | |
| 5,696,557 | A * | 12/1997 | Yamashita et al. | 348/390.1 |
| 5,809,454 | A * | 9/1998 | Okada et al. | 704/214 |
| 5,982,431 | A * | 11/1999 | Chung | 375/240.01 |
| 6,163,647 | A | 12/2000 | Terashima et al. | |
| 6,233,389 | B1 * | 5/2001 | Barton et al. | 386/46 |
| 6,347,185 | B1 * | 2/2002 | Takahashi et al. | 386/95 |
| 6,967,599 | B1 * | 11/2005 | Choi et al. | 341/61 |
| 2001/0008577 | A1 * | 7/2001 | Yamada et al. | 386/98 |
| 2001/0047267 | A1 * | 11/2001 | Abiko et al. | 704/500 |

FOREIGN PATENT DOCUMENTS

| JP | 08-046884 | 2/1996 |
| JP | 2532731 | 6/1996 |

(Continued)

OTHER PUBLICATIONS

Japanese International Search Report for PCT/JP02/10778, dated Feb. 18, 2003.
Japanese Official Action, mailed Jan. 11, 2005.
Japanese Office Action for 2002-303519 dated May 10, 2005.

*Primary Examiner*—Paulos M. Natnael
(74) *Attorney, Agent, or Firm*—RatnerPrestia

(57) ABSTRACT

An audio video reproduction apparatus having: an audio speed conversion circuit of performing audio speed conversion on a generated audio signal in such a manner that the information on an A-PTS is maintained, depending on an executing reproduction speed. An audio output buffer circuit of accumulating the audio signal having undergone the audio speed conversion and of outputting the signal according to the executing reproduction speed. A video output buffer circuit of accumulating and outputting a generated video signal. A comparison circuit of comparing the A-PTS with a V-PTS by using the maintained information on the A-PTS; wherein using the result of the comparison, the video output buffer circuit outputs the accumulated video signal according to the executing reproduction speed.

12 Claims, 13 Drawing Sheets

| | FOREIGN PATENT DOCUMENTS | |
|---|---|---|
| JP | 08-214296 | 8/1996 |
| JP | 08-251543 A | 9/1996 |
| JP | 09-106627 | 4/1997 |
| JP | 09-167445 | 6/1997 |
| JP | 09-200698 | 7/1997 |
| JP | 10-164508 | 6/1998 |
| JP | 11-164256 A | 6/1999 |
| JP | 0920219 A2 | 6/1999 |
| JP | 2001-008170 | 1/2001 |
| JP | 2001-069467 | 3/2001 |
| JP | 2001-103401 A | 4/2001 |
| JP | 2001-202698 A | 7/2001 |

* cited by examiner

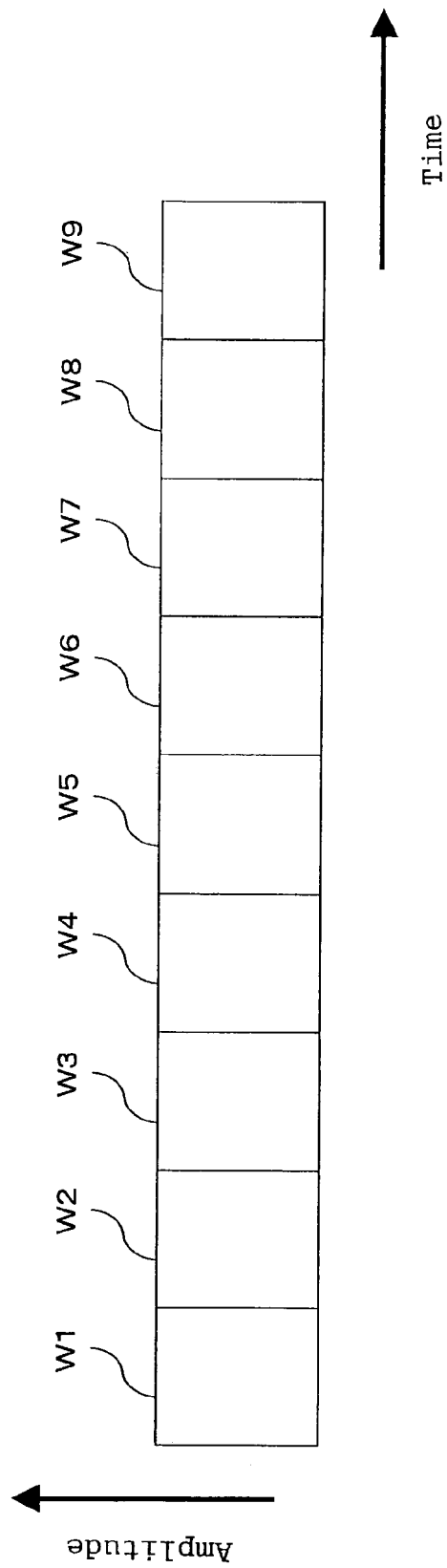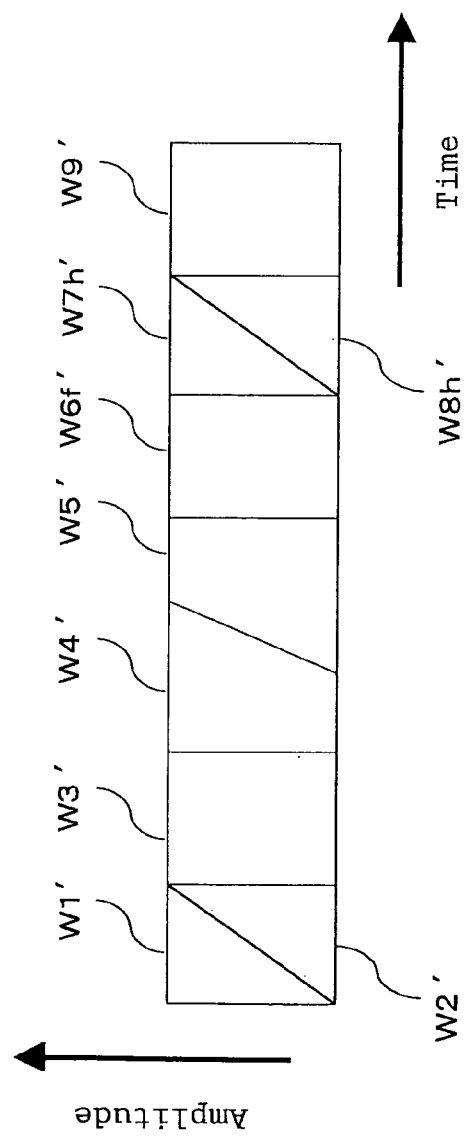
Fig. 3 (A)
Fig. 3 (B)

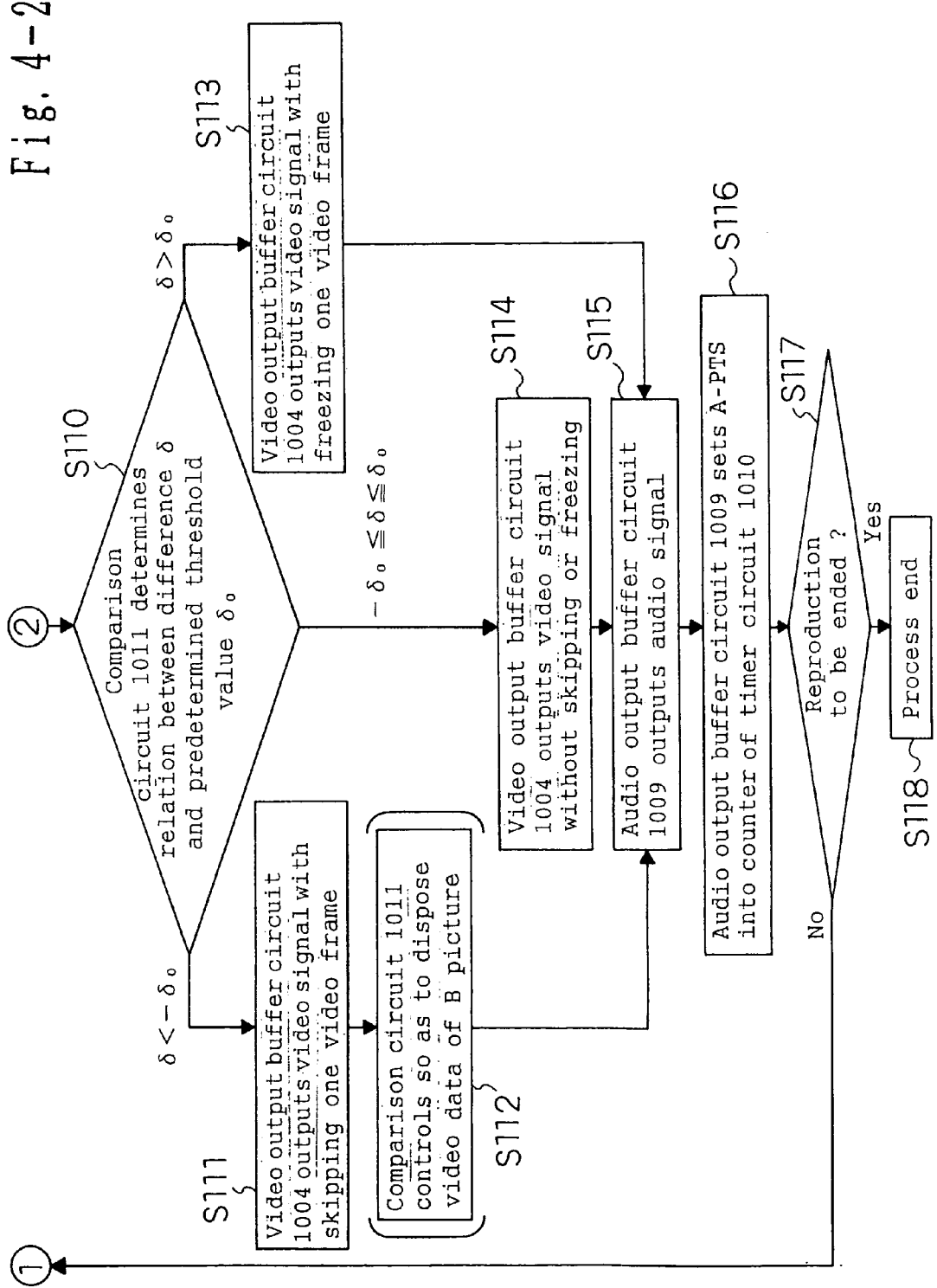

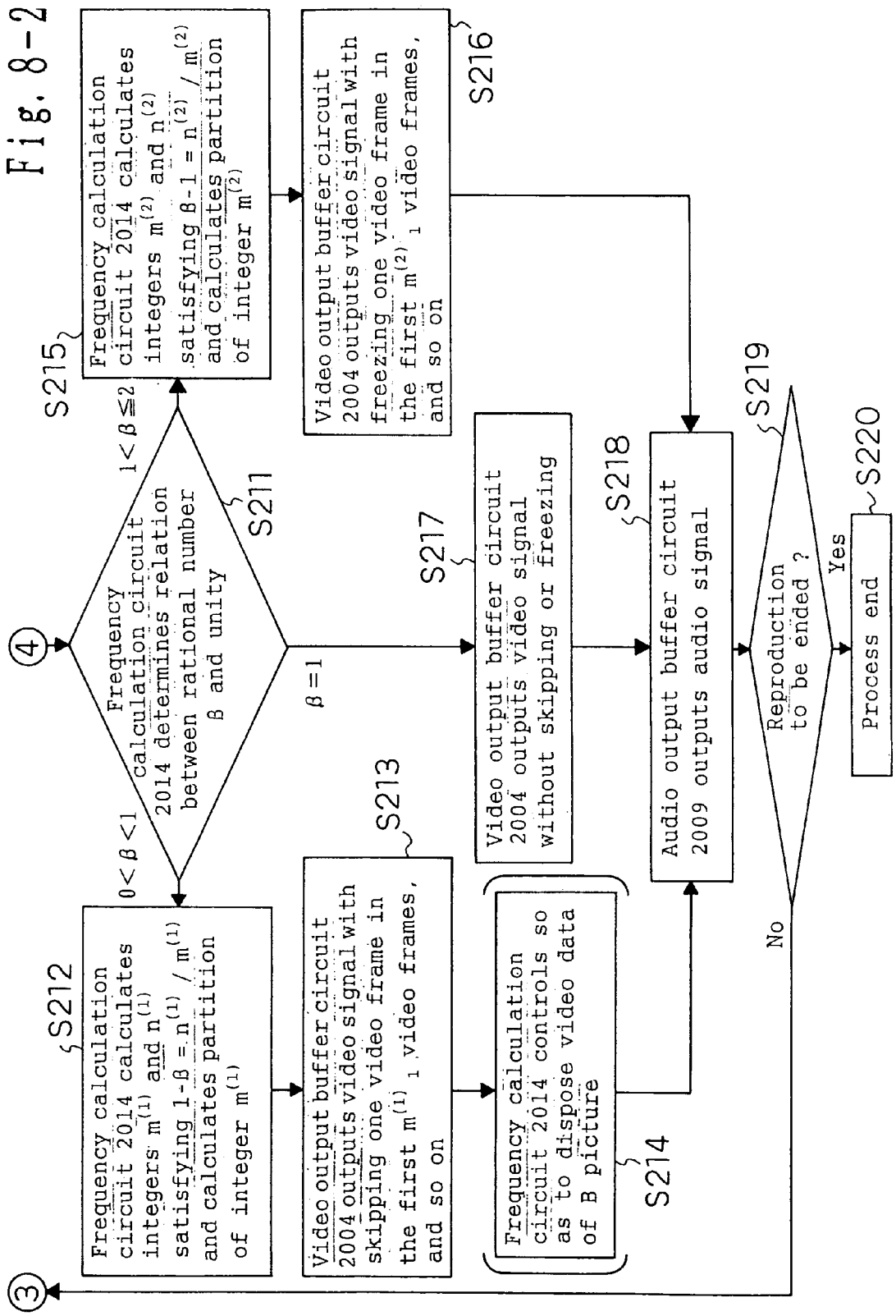

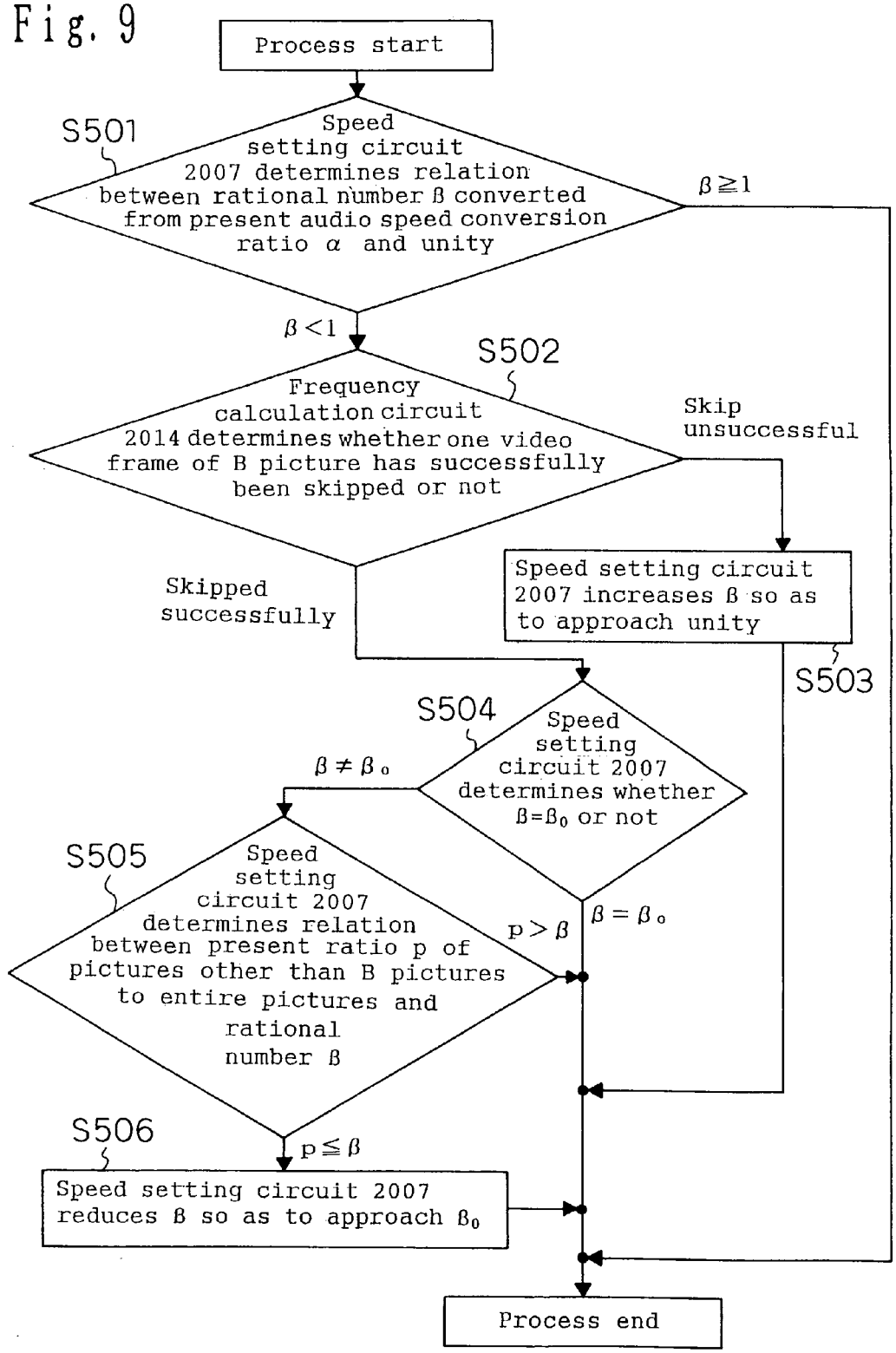

AUDIO VIDEO REPRODUCTION APPARATUS, AUDIO VIDEO REPRODUCTION METHOD, PROGRAM, AND MEDIUM

This application is a U.S. National Phase Application of PCT International Application PCT/JP02/10778.

TECHNICAL FIELD

The present invention relates to an audio video reproduction apparatus, an audio video reproduction method, a program, and a medium in which synchronization between video and audio is maintained even when reproduction is performed at a speed other than the single speed.

BACKGROUND ART

In a prior art audio video reproduction apparatus, reproduction is performed by a method described below in which synchronization between video and audio is maintained (for example, see JP-A2001-8170). Further, FIG. 11 is a block diagram of a prior art audio video reproduction apparatus in which synchronization between video and audio is maintained even when reproduction is performed at a speed other than the single speed.

Here, the entire disclosure of JP-A2001-8170 is incorporated herein by reference in its entirety.

A system analyzing circuit 1 is a circuit of classifying input data into video data and audio data.

A video input buffer circuit 2 is a circuit of accumulating the video data outputted from the system analyzing circuit 1, while a video decoding circuit 3 is a circuit of acquiring the video data from the video input buffer circuit 2 and thereby decoding and converting the data into a video signal.

A video output buffer circuit 4 is a circuit of accumulating and outputting the video signal outputted from the video decoding circuit 3.

An audio input buffer circuit 5 is a circuit of accumulating the audio data outputted from the system analyzing circuit 1, while an audio decoding circuit 6 is a circuit of acquiring the audio data from the audio input buffer circuit 5 and thereby decoding and converting the data into an audio signal.

An audio output buffer circuit 9 is a circuit of accumulating and outputting the audio signal outputted from the audio decoding circuit 6.

A speed setting circuit 7 is a circuit of setting a desired speed in response to a user's instruction through a remote controller or the like. A video output control circuit 21 is a circuit which depending on the speed set by the speed setting circuit 7, outputs a control signal to the video output buffer circuit 4 so that the video signal is skipped when the continuation time is to be reduced, and which outputs a control signal to the video output buffer circuit 4 so that the video signal is frozen when the continuation time is to be extended.

An audio output control circuit 22 is a circuit which monitors the situation of accumulation of the audio signal in the audio output buffer circuit 9, and (1) which outputs a control signal to the audio output buffer circuit 9 so that the audio signal is skipped when the continuation time is to be reduced and hence when the audio signal tends to overflow in the audio output buffer circuit 9, and (2) which outputs a control signal to the audio output buffer circuit 9 so that the audio signal is repeated or paused when the continuation time is to be extended and hence when the audio signal tends to lack in the audio output buffer circuit 9.

Described next is the operation of the prior art audio video reproduction apparatus.

The system analyzing circuit 1 classifies input data into video data and audio data.

The video input buffer circuit 2 accumulates the video data outputted from the system analyzing circuit 1, while the video decoding circuit 3 acquires the video data from the video input buffer circuit 2 and thereby decodes and converts the data into a video signal.

The video output buffer circuit 4 accumulates and outputs the video signal outputted from the video decoding circuit 3.

The audio input buffer circuit 5 accumulates the audio data outputted from the system analyzing circuit 1, while the audio decoding circuit 6 acquires the audio data from the audio input buffer circuit 5 and thereby decodes and converts the data into an audio signal.

The audio output buffer circuit 9 accumulates and outputs the audio signal outputted from the audio decoding circuit 6.

The speed setting circuit 7 sets a desired speed in response to a user's instruction through a remote controller or the like. Depending on the speed set by the speed setting circuit 7, the video output control circuit 21 outputs a control signal to the video output buffer circuit 4 so that the video signal is skipped when the continuation time is to be reduced, and outputs a control signal to the video output buffer circuit 4 so that the video signal is frozen when the continuation time is to be extended.

The audio output control circuit 22 monitors the situation of accumulation of the audio signal in the audio output buffer circuit 9, and (1) outputs a control signal to the audio output buffer circuit 9 so that the audio signal is skipped when the continuation time is to be reduced and hence when the audio signal tends to overflow in the audio output buffer circuit 9, and (2) outputs a control signal to the audio output buffer circuit 9 so that the audio signal is repeated or paused when the continuation time is to be extended and hence when the audio signal tends to lack in the audio output buffer circuit 9.

Thus, (1) when the continuation time is to be reduced, a control signal is outputted to the audio output buffer circuit 9 so that the audio signal is skipped, whereby it is suppressed that the audio signal tends to overflow in the audio output buffer circuit 9, and (2) when the continuation time is to be extended, a control signal is outputted to the audio output buffer circuit 9 so that the audio signal is repeated or paused, whereby it is suppressed that the audio signal tends to lack in the audio output buffer circuit 9.

Nevertheless, in the prior art audio video reproduction apparatus described above, there has been the problem that during the changing of the speed such that the continuation time is reduced or extended, the output timing of the video signal and the output timing of the audio signal can largely deviate from each other in comparison with the case of normal reproduction, and that the synchronization can not be maintained.

Further, there are needs for fast browsing and slow listening. In such fast browsing and slow listening, the AV synchronization needs to be ensured.

DISCLOSURE OF INVENTION

With considering the above-mentioned problem, an object of the invention is to provide an audio video reproduction apparatus, an audio video reproduction method, a program, and a medium in which even when the reproduction speed is set different from the normal reproduction speed, the output timing of the video signal and the output timing of the audio signal do not largely deviate from each other in comparison with the case of normal reproduction, and hence their synchronization is maintained more precisely.

A first aspect of the present invention is an audio video reproduction apparatus comprising:

classifying means of classifying externally inputted MPEG (Moving Picture Experts Group) data containing audio data having an A-PTS (audio-presentation time stamp) and video data having a V-PTS (video-presentation time stamp) into said audio data and said video data;

audio signal generating means of decoding said classified audio data and thereby generating an audio signal;

audio speed converting means of performing audio speed conversion on said generated audio signal in such a manner that the information on said A-PTS is maintained, depending on an executing reproduction speed which is determined on the basis of an external setting reproduction speed having been set externally and at which actual reproduction is performed;

audio signal accumulating and outputting means of accumulating said audio signal having undergone the audio speed conversion and of outputting said accumulated audio signal according to said executing reproduction speed;

video signal generating means of decoding said classified video data and thereby generating a video signal;

video signal accumulating and outputting means of accumulating said generated video signal and outputting said accumulated video signal; and comparing means of comparing said A-PTS corresponding to the audio signal outputted from said audio signal accumulating and outputting means with said V-PTS corresponding to the video signal outputted from said video signal accumulating and outputting means, by using said maintained information on the A-PTS; wherein using the result of said comparison, said video signal accumulating and outputting means outputs said accumulated video signal according to said executing reproduction speed.

A second aspect of the present invention is an audio video reproduction apparatus according to the first aspect of the present invention, wherein as a result of said comparison, said video signal accumulating and outputting means (1) outputs said accumulated video signal with using skip operation when said A-PTS corresponding to the audio signal outputted from said audio signal accumulating and outputting means is in advance of said V-PTS corresponding to the video signal outputted from said video signal accumulating and outputting means, and (2) outputs said accumulated video signal with using freeze operation when said A-PTS corresponding to the audio signal outputted from said audio signal accumulating and outputting means is behind said V-PTS corresponding to the video signal outputted from said video signal accumulating and outputting means.

A third aspect of the present invention is an audio video reproduction apparatus according to the second aspect of the present invention, wherein as a result of said comparison, when said A-PTS corresponding to the audio signal outputted from said audio signal accumulating and outputting means is in advance of said V-PTS corresponding to the video signal outputted from said video signal accumulating and outputting means, said video signal accumulating and outputting means skips all or part of B pictures of said accumulated video signal.

A fourth aspect of the present invention is an audio video reproduction apparatus according to the first aspect of the present invention, further comprising video data accumulating means which is inserted between said classifying means and said video signal generating means and which accumulates said classified video data, wherein as a result of said comparison, when said A-PTS corresponding to the audio signal outputted from said audio signal accumulating and outputting means is in advance of said V-PTS corresponding to the video signal outputted from said video signal accumulating and outputting means, said video data accumulating means disposes of all or part of B pictures of said classified video data.

A fifth aspect of the present invention is an audio video reproduction apparatus according to the first aspect of the present invention, wherein said executing reproduction speed is (1) adjusted depending on whether said accumulated video signal has successfully been outputted according to said executing reproduction speed or not, alternatively (2) adjusted to approach the single speed when said accumulated video signal has not successfully been outputted according to said executing reproduction speed, and adjusted to approach said external setting reproduction speed when said accumulated video signal has successfully been outputted according to said executing reproduction speed, or alternatively (3) adjusted on the basis of the frequency of B pictures in said video data.

A sixth aspect of the present invention is an audio video reproduction method comprising:

a classifying step of classifying externally inputted MPEG (Moving Picture Experts Group) data containing audio data having an A-PTS (audio-presentation time stamp) and video data having a V-PTS (video-presentation time stamp) into said audio data and said video data;

an audio signal generating step of decoding said classified audio data and thereby generating an audio signal;

an audio speed converting step of performing audio speed conversion on said generated audio signal in such a manner that the information on said A-PTS is maintained, depending on an executing reproduction speed which is determined on the basis of an external setting reproduction speed having been set externally and at which actual reproduction is performed;

an audio signal accumulating and outputting step of accumulating said audio signal having undergone the audio speed conversion and of outputting said accumulated audio signal according to said executing reproduction speed;

a video signal generating step of decoding said classified video data and thereby generating a video signal;

a video signal accumulating and outputting step of accumulating said generated video signal and outputting said accumulated video signal; and a comparing step of comparing said A-PTS corresponding to the audio signal outputted in said audio signal accumulating and outputting step with said V-PTS corresponding to the video signal outputted in said video signal accumulating and outputting step, by using said maintained information on the A-PTS; wherein in said video signal accumulating and outputting step, using the result of said comparison, said accumulated video signal is outputted according to said executing reproduction speed.

A seventh aspect of the present invention is a program of causing a computer to execute the classifying step, the audio signal generating step, the audio speed converting step, the audio signal accumulating and outputting step, the video signal generating step, the video signal accumulating and outputting step, and the comparing step of the audio video reproduction method according to the sixth invention of the present invention.

An eighth aspect of the present invention is a computer-processable medium which carries the program according to the seventh aspect of the present invention.

BRIEF DESCRIPTION OF DRAWINGS

FIG. 3(A) is a diagram illustrating an audio speed conversion method (Method 1) according to Embodiment 1 of the invention.

FIG. 3(B) is a diagram illustrating an audio speed conversion method (Method 2) according to Embodiment 1 of the invention.

FIGS. 4-1 and 4-2 taken together is a flowchart (Chart 1) of an audio video reproduction apparatus according to Embodiment 1 of the invention.

FIGS. 8-1 and 8-2 taken together is a flowchart (Chart 1) of an audio video reproduction apparatus according to Embodiment 2 of an invention relevant to the present invention.

FIG. 9 is a flowchart (Chart 2) of an audio video reproduction apparatus according to Embodiment 2 of an invention relevant to the present invention.

DESCRIPTION OF REFERENCE NUMERALS

1001 System analyzing circuit
1002 Video input buffer circuit
1003 Video decoding circuit
1004 Video output buffer circuit
1104 V-PTS buffer circuit
1005 Audio input buffer circuit
1006 Audio decoding circuit
1007 Speed setting circuit
1008 Audio speed conversion circuit
1009 Audio output buffer circuit
1209 A-PTS buffer circuit
1010 Timer circuit
1011 Comparison circuit

BEST MODE FOR CARRYING OUT THE INVENTION

Figure 1:
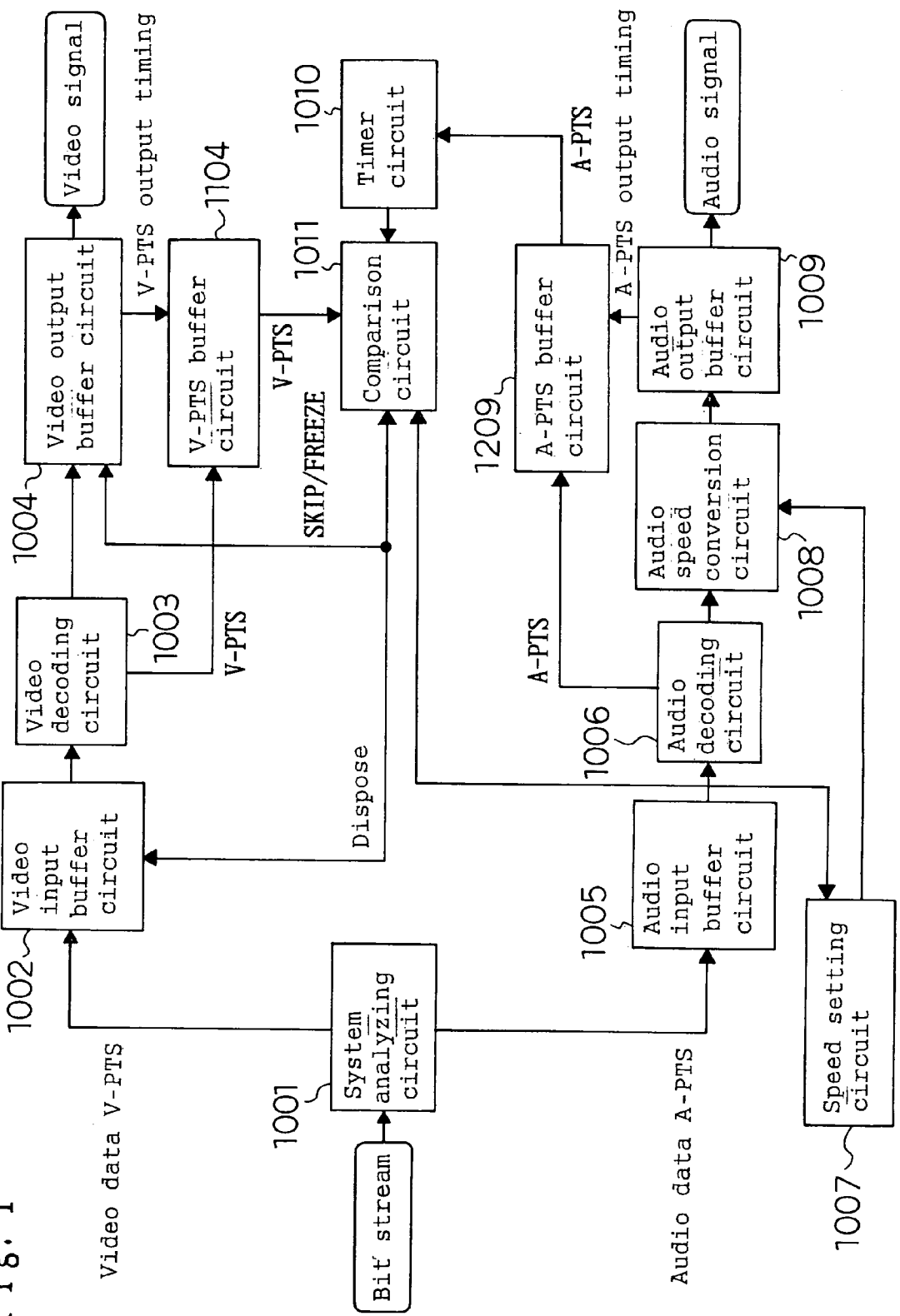
FIG. 1 is a block diagram of an audio video reproduction apparatus according to Embodiment 1 of the invention.

Embodiments of the invention are described below with reference to the drawings.
(Embodiment 1)
First, the configuration of an audio video reproduction apparatus according to the present embodiment is described below with reference mainly to FIG. 1 which is a block diagram showing an audio video reproduction apparatus according to an MPEG standard of Embodiment 1 of the invention.

Figure 2:
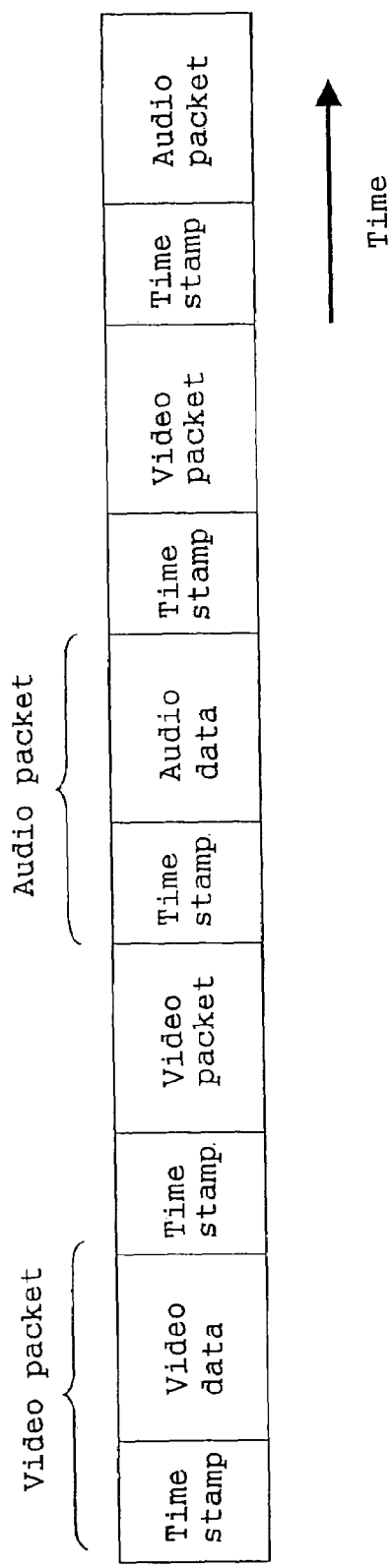
FIG. 2 is a diagram illustrating input data according to Embodiment 1 of the invention.

A system analyzing circuit 1001 is a circuit of classifying video data having a V-PTS (video-presentation time stamp) and audio data having an A-PTS (audio-presentation time stamp) from input data shown in FIG. 2 which is a diagram illustrating input data according to Embodiment 1 of the invention.

According to the MPEG standard, image data and audio data decoded in advance or behind relative to each other with respect to time are rearranged using information on reproduction time respectively indicated in the above-mentioned V-PTS and A-PTS, and then outputted.

A video input buffer circuit 1002 is a circuit of accumulating the video data and the V-PTS outputted from the system analyzing circuit 1001, while a video decoding circuit 1003 is a circuit of acquiring the video data from the video input buffer circuit 1002, thereby decoding and converting the data into a video signal, and outputting the corresponding V-PTS to a V-PTS buffer circuit 1104.

A video output buffer circuit 1004 is a circuit of accumulating and outputting the video signal and the corresponding V-PTS outputted from the video decoding circuit 1003.

A V-PTS buffer circuit 1104 is a circuit of accumulating and outputting the V-PTS outputted from the video decoding circuit 1003.

An audio input buffer circuit 1005 is a circuit of accumulating the audio data and the A-PTS outputted from the system analyzing circuit 1001, while an audio decoding circuit 1006 is a circuit of acquiring the audio data from the audio input buffer circuit 1005, thereby decoding and converting the data into an audio signal, and outputting the corresponding A-PTS to an A-PTS buffer circuit 1209.

A speed setting circuit 1007 is a circuit of setting a desired audio speed conversion ratio α in response to a user's instruction externally provided through a remote controller or the like.

For example, in case of the audio speed conversion ratio $\alpha=\frac{1}{2}$, the continuation time of the audio signal becomes $\frac{1}{2}$ in comparison with the case where the audio is reproduced at the single speed. Thus, in a timer circuit 1010, the A-PTS is renewed at twice the frequency, and hence the time indicated by the timer circuit 1010 progresses at twice the speed, although the progress is not continuous. That is, when the continuation time of the audio signal is extended, the time interval of A-PTSs outputted from the A-PTS buffer circuit 1209 becomes longer, whereas when the continuation time of the audio signal is reduced, the time interval of A-PTSs outputted from the A-PTS buffer circuit 1209 becomes shorter. As such, these A-PTSs are outputted to the timer circuit 1010, whereby the counter of the timer circuit 1010 is forcedly corrected by the A-PTSs depending on the audio speed conversion ratio.

An audio speed conversion circuit 1008 is a circuit which using an audio speed conversion method of changing solely the continuation time without changing the frequency (pitch of sound), performs an audio speed conversion process on the audio signal outputted from the audio decoding circuit 1006 on the basis of the audio speed conversion ratio α outputted from the speed setting circuit 1007, and thereby causes an audio output buffer circuit 1009 to perform outputting so that the time correspondence with A-PTS output timing is maintained.

Here, the audio speed conversion method used in the present embodiment may be an audio speed conversion method described in the specification of Patent No.

2532731. In this audio speed conversion method, an inputted audio waveform is multiplied by a window function, and then a superposed addition is applied such that the value of a correction function becomes large. This realizes audio speed conversion in which discontinuity in the amplitude and the phase of the audio waveform and loss in the audio data seldom occur.

Here, the entire disclosure of the specification of Patent No. 2532731 is incorporated herein by reference in its entirety.

For example, when audio speed conversion is performed at an audio speed conversion ratio $\alpha=\frac{2}{3}$ using this audio speed conversion method, audio waveforms W1–W9 shown in FIG. 3(A) which is a diagram illustrating an audio speed conversion method (Method 1) according to Embodiment 1 of the invention can be converted into audio waveforms W1'–W9' shown in FIG. 3(B) which is a diagram illustrating an audio speed conversion method (Method 2) according to Embodiment 1 of the invention.

More specifically, for example, the audio waveforms W1 and W2 are superposed in such a manner that no discontinuity occurs in the amplitude, and then the continuation time solely is changed without a substantial change in the frequency, whereby the audio waveforms are converted into the audio waveforms W1' and W2'. The audio waveform W3 is converted into the audio waveform W3' almost intact. The audio waveforms W4 and W5 are superposed in such a manner that no discontinuity occurs in the amplitude and that the phases are shifted to each other, and then the continuation time solely is changed without a substantial change in the frequency, whereby the audio waveforms are converted into the audio waveforms W4' and W5'.

An audio output buffer circuit 1009 is a circuit of accumulating the audio signal and the A-PTS output timing outputted from the audio speed conversion circuit 1008, thereby outputting the audio signal continuously according to a sampling frequency, and outputting the A-PTS output timing to an A-PTS buffer circuit 1209 when the corresponding audio signal is outputted.

An A-PTS buffer circuit 1209 is a circuit of accumulating and outputting the A-PTS outputted from the audio decoding circuit 1006, in synchronization with the A-PTS output timing outputted from the audio output buffer circuit 1009.

A timer circuit 1010 is a circuit of setting the A-PTS outputted from the A-PTS buffer circuit 1209 and thereby measuring time T (which is approximately the same as a counter value described later).

A comparison circuit 1011 is a circuit which compares the time T outputted from the timer circuit 1010 with the V-PTS outputted from the V-PTS buffer circuit 1104, thereby (1) controls the video output buffer circuit 1004 so that the video signal is frozen when the audio speed conversion circuit 1008 has extended the continuation time of the audio and hence the V-PTS is in advance of the time T, and (2) controls the video output buffer circuit 1004 so that the video signal (for example, a B picture which is of a type of video not referred to by the video decoding circuit 1003 during the decoding of another picture) is skipped when the audio speed conversion circuit 1008 has reduced the continuation time of the audio and hence the V-PTS is behind the time T.

The comparison circuit 1011 is a circuit of controlling the video input buffer circuit 1002 so that video data of B picture is disposed of in the latter case where the V-PTS is behind the time T. This controlling operation by the comparison circuit 1011 is performed in order to reduce the amount of processing in the video decoding circuit 1003 without problems during the decoding, and hence is obviously not indispensable.

Such control permits more reliable synchronization between the audio signal outputted from the audio output buffer circuit 1009 and the video signal outputted from the video output buffer circuit 1004.

Means including the system analyzing circuit 1001 corresponds to classifying means according to the invention. Means including the audio decoding circuit 1006 corresponds to audio signal generating means according to the invention. Means including the audio speed conversion circuit 1008 corresponds to audio speed converting means according to the invention. Means including the audio output buffer circuit 1009 corresponds to audio signal accumulating and outputting means according to the invention. Means including the video decoding circuit 1003 corresponds to video signal generating means according to the invention. Means including the video output buffer circuit 1004 corresponds to video signal accumulating and outputting means according to the invention. Means including the comparison circuit 1011 corresponds to comparing means according to the invention. Means including the video input buffer circuit 1002 corresponds to video data accumulating means according to the invention.

Figures 1, 4:
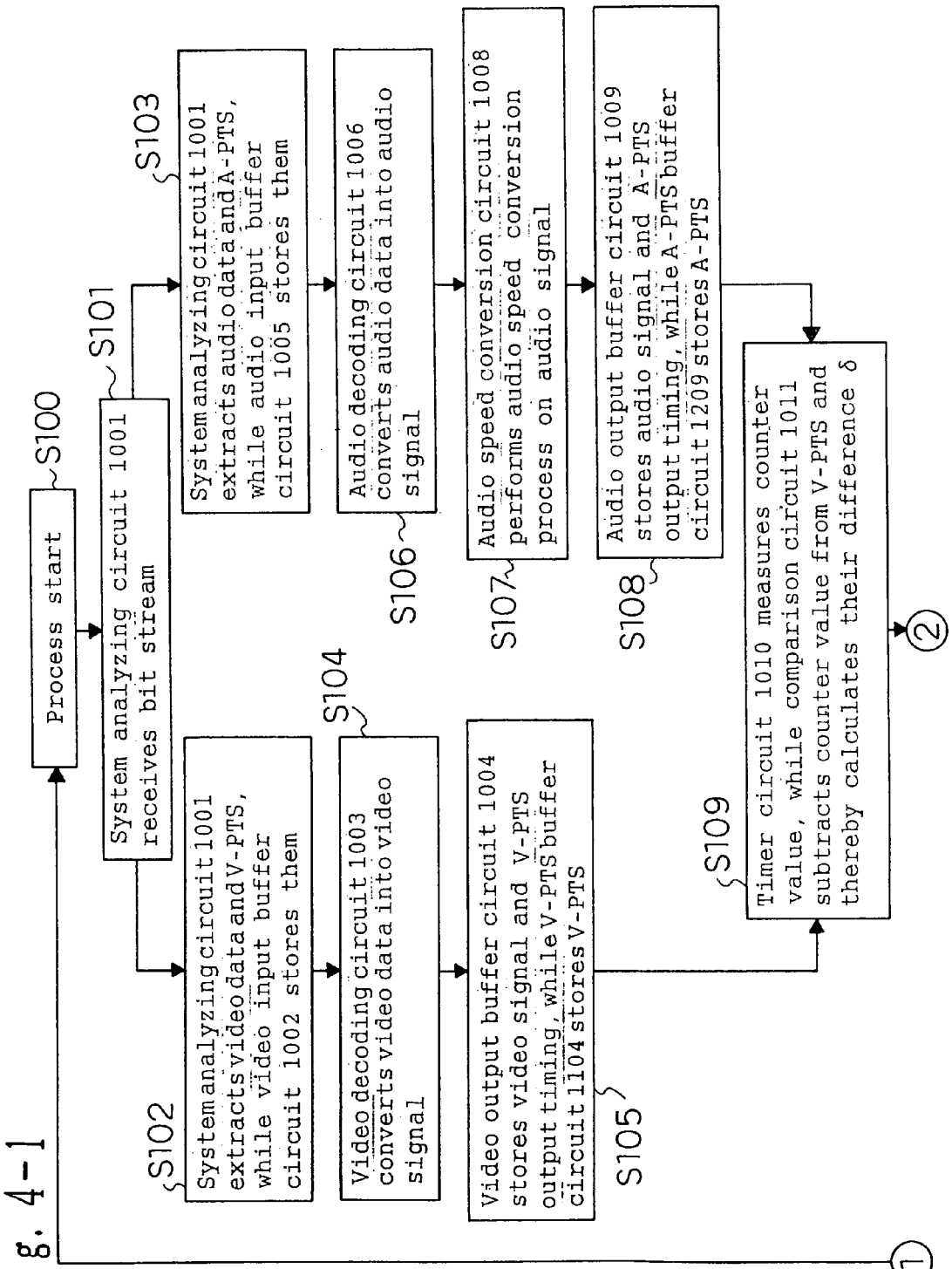

The operation of the audio video reproduction apparatus according to the present embodiment is described next with reference mainly to FIG. 4 which is a flowchart (Chart 1) of an audio video reproduction apparatus according to Embodiment 1 of the invention. At the same time as the description of the operation of the audio video reproduction apparatus according to the present embodiment, an embodiment of an audio video reproduction method according to the invention is also described.

Steps 100 and 101; The process begins (Step 100). The system analyzing circuit 1001 receives a bit stream (Step 101).

Step 102; The system analyzing circuit 1001 extracts, from the bit stream, video data and a video packet in which a V-PTS corresponding to the video data is recorded. The video input buffer circuit 1002 stores them.

Step 103; The system analyzing circuit 1001 extracts, from the bit stream, audio data and an audio packet in which an A-PTS corresponding to the audio data is recorded. The audio input buffer circuit 1005 stores them.

Steps 104 and 105; The video decoding circuit 1003 acquires the video data from the video input buffer circuit 1002, thereby decodes and converts the data into a video signal (Step 104).

The video output buffer circuit 1004 stores the video signal and the V-PTS output timing, while the V-PTS buffer circuit 1104 stores the V-PTS (Step 105).

Steps 106–108; The audio decoding circuit 1006 acquires the audio data from the audio input buffer circuit 1005, thereby decodes and converts the data into an audio signal (Step 106).

The audio speed conversion circuit 1008 performs an audio speed conversion process on the audio signal on the basis of the audio speed conversion ratio $\alpha$ having been set by the speed setting circuit 1007 (Step 107).

The audio output buffer circuit 1009 stores the audio signal the continuation time of which has been changed and the A-PTS output timing, while the A-PTS buffer circuit 1209 stores the A-PTS (Step 108).

Step 109; The timer circuit 1010 measures a counter value corresponding to the A-PTS outputted from the A-PTS buffer circuit 1209 (and hence corresponding to the audio signal outputted from the audio output buffer circuit 1009), while the comparison circuit 1011 subtracts the counter value from the V-PTS corresponding to the video signal outputted from the V-PTS buffer circuit 1104 and thereby calculates their difference δ.

Steps 110–114; The comparison circuit 1011 determines the relation between the difference δ and a predetermined threshold value $δ_0$ (Step 110).

(1) When it is determined that $δ<-δ_0$ (that is, the video-presentation time stamp is rather behind the audio-presentation time stamp), the video output buffer circuit 1004 outputs the video signal stored therein, with skipping one video frame (Step 111).

Further, the comparison circuit 1011 controls the video input buffer circuit 1002 so that video data of B picture is disposed of (Step 112).

(2) When it is determined that $δ>δ_0$ (that is, the video-presentation time stamp is rather in advance of the audio-presentation time stamp), the video output buffer circuit 1004 outputs the video signal stored therein, with freezing one video frame (Step 113).

(3) When it is determined that $-δ_0 ≦ δ ≦ δ_0$ (that is, the video-presentation time stamp is almost neither in advance nor behind the audio-presentation time stamp), the video output buffer circuit 1004 outputs the video signal without skipping or freezing (Step 114).

Steps 115–118; The audio output buffer circuit 1009 outputs the audio signal (Step 115), and then sets the A-PTS corresponding to the audio signal into the counter of the timer circuit 1010 via the A-PTS buffer circuit 1209 (Step 116). (1) When the reproduction is to be ended, a series of these processes are terminated, whereas (2) when the reproduction is not to be ended, a series of these processes are repeated (Steps 117 and 118).

The configuration and the operation of the audio video reproduction apparatus according to the present embodiment have been described above in detail.

(A) In place of the control that the comparison circuit 1011 controls the video output buffer circuit 1004 so that the video signal is skipped (or alternatively, along with such control that the video signal is skipped), the comparison circuit 1011 may notify this to the video input buffer circuit 1002, whereby on recognizing the notification, the video decoding circuit 1003 may identify and skip video data of B picture by itself.

That is, B pictures are identified from pictures of the other types, whereby video data of B picture solely is disposed of or skipped. This reduces the amount of processing in the video decoding circuit 1003 without problems during the decoding, and hence permits the reduction of the capacity of the video output buffer circuit 1004.

(B) Nevertheless, there is a case where the ratio p of the pictures other than B pictures to the entire pictures is excessively large in comparison with an audio speed conversion ratio $α_0<1$ having been set externally (that is, a case where the ratio of B pictures is extremely small in comparison with the audio speed conversion ratio $α_0$). In such a case, the video signal of B picture could be insufficiently disposed of or skipped, whereby the V-PTS outputted from the video output buffer circuit 1004 could become smaller and smaller than the time T (counter value) outputted from the timer circuit 1010.

When this situation continues, the synchronization could be lost between the video signal and the audio signal. Further, overflow could occur in the video output buffer circuit 1004.

Thus, a control sequence of adjusting and maintaining the audio speed conversion ratio α within the range $α_0 ≦ α ≦ 1$ may be provided when necessary.

Figure 5:
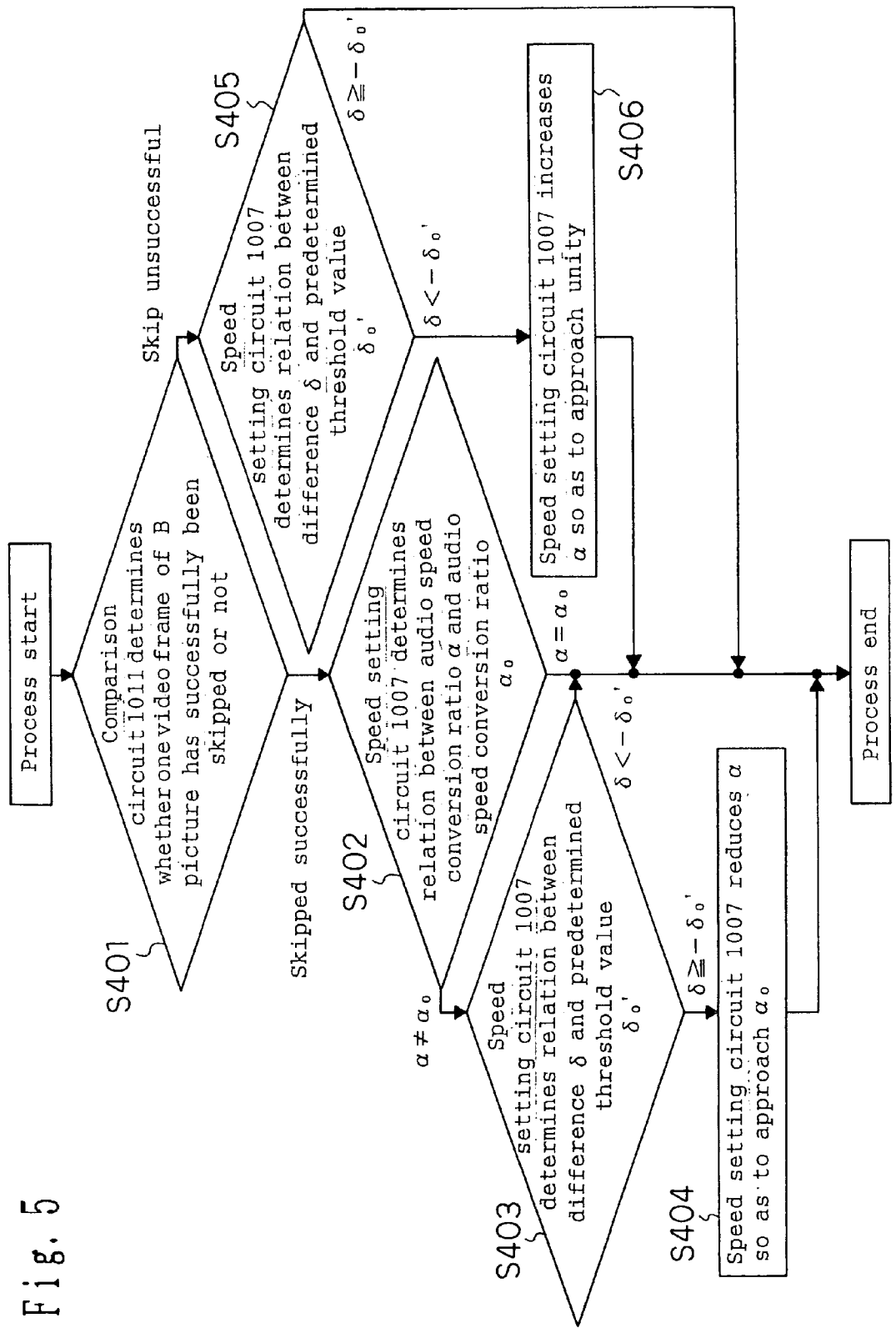
FIG. 5 is a flowchart (Chart 2) of an audio video reproduction apparatus according to Embodiment 1 of the invention.

More specifically, the audio video reproduction apparatus according to the present embodiment may comprise the following audio speed conversion ratio adjusting mode as shown in FIG. 5 which is a flowchart (Chart 2) of an audio video reproduction apparatus according to Embodiment 1 of the invention.

Steps 401–406; The comparison circuit 1011 determines whether the above-mentioned one video frame of B picture has successfully been skipped or not (Step 401).

(1) When it is determined that the skip has been successful, the speed setting circuit 1007 determines the present relation between the audio speed conversion ratio α and the audio speed conversion ratio $α_0$ (Step 402).

The speed setting circuit 1007 (a) maintains present α when it is determined that $α=α_0$, and (b) determines the relation between the above-mentioned difference δ and a predetermined threshold value $δ_0'$ when it is determined that $α≠α_0$ (Step 403), and thereby (b1) maintains present α without reducing α to make it approach $α_0$ when it is determined that $δ<-δ_0'$ (that is, the V-PTS is rather behind), (b2) and reduces α to make it approach $α_0$ when it is determined that $δ≧-δ_0'$ (Step 404).

(2) When it is determined that the skip has been unsuccessful, the speed setting circuit 1007 determines the relation between the difference δ and the predetermined threshold value $δ_0'$ (Step 405).

The speed setting circuit 1007 (a) increases α to make it approach unity when it is determined that $δ<-δ_0'$ (Step 406), (b) and maintains present α without increasing α to make it approach unity when it is determined that $δ≧-δ_0'$.

(C) Of course, the adjustment of the audio speed conversion ratio α within the range $α_0 ≦ α ≦ 1$ may be an adjustment of the audio speed conversion ratio α so that $α=α_0$ or $α=1$.

For example, when the relation $α=1$ is set immediately in Step 406, the operation process of preventing the situation of $α>1$ becomes unnecessary. Accordingly, even when the video signal contains no B picture, the synchronization error between the video signal and the audio signal and the overflow in the video output buffer circuit 1004 are easily avoided. Further, when the relation $α=α_0$ is set immediately in Step 404, the operation process of preventing the situation of $α<α_0$ becomes unnecessary. Accordingly, when the ratio p of the pictures other than B pictures to the entire pictures becomes small, the intrinsic audio speed conversion ratio is easily realized.

(D) In the audio video reproduction apparatus according to the present embodiment, (1) the audio speed conversion circuit 1008 has performed audio speed conversion on the audio signal generated by the audio decoding circuit 1006, in such a manner that the information on the A-PTS is maintained, depending on the setting from the speed setting circuit 1007, while (2) the comparison circuit 1011 has compared the A-PTS and the V-PTS, using the A-PTS output timing outputted from the audio output buffer circuit 1009 to the A-PTS buffer circuit 1209.

However, the invention is not limited to this. When the process delay in the audio speed conversion circuit 1008 and the waiting time in the audio output buffer circuit 1009 are estimated and known in advance, the A-PTS does not need to be outputted from the A-PTS buffer circuit 1209 in response to the A-PTS output timing outputted from the audio output buffer circuit 1009.

Figure 6:
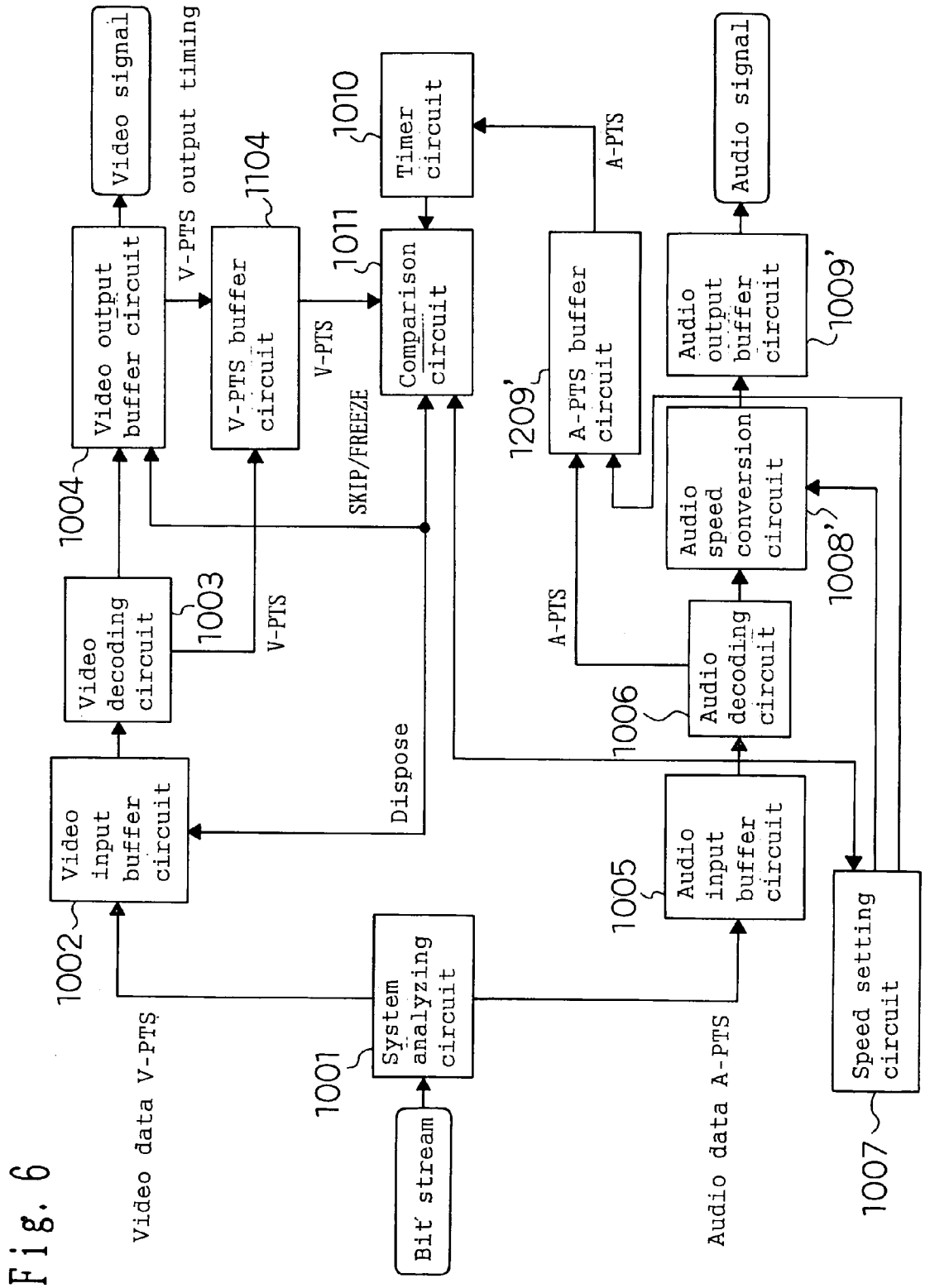
FIG. 6 is a block diagram of an audio video reproduction apparatus according to an embodiment of an invention relevant to the present invention.

More specifically, as shown in FIG. 6 which is a block diagram of an audio video reproduction apparatus according to an embodiment of an invention relevant to the present invention, (1) an audio speed conversion circuit 1008' may perform audio speed conversion on the audio signal generated by the audio decoding circuit 1006, depending on the setting from the speed setting circuit 1007, (2) an A-PTS buffer circuit 1209' may perform delay processing on the A-PTS outputted from the audio decoding circuit 1006 by the total time of both the process delay in the audio speed conversion circuit 1008' and the waiting time in the audio output buffer circuit 1009', and then output the A-PTS to the timer circuit 1010, and (3) the comparison circuit 1011 may compare the time T (counter value) outputted from the timer circuit 1010 with the V-PTS outputted from the V-PTS buffer circuit 1104.

Obviously, when the process delay in the audio speed conversion circuit 1008' and the waiting time in the audio output buffer circuit 1009' vary depending on the setting of the speed setting circuit 1007, the setting of the speed setting circuit 1007 may be outputted to the A-PTS buffer circuit 1209', whereby the delay time may be changed depending on the audio speed conversion ratio.

Means including the audio speed conversion circuit 1008' corresponds to audio speed converting means according to an invention relevant to the present invention. Means including the audio output buffer circuit 1009' corresponds to audio signal accumulating and outputting means according to an invention relevant to the present invention. Means including the A-PTS buffer circuit 1209' corresponds to delay information generating means according to an invention relevant to the present invention.

Further, a predetermined delay information according to an invention relevant to the present invention corresponds to information used for the compensation of the above-mentioned delay time based on the consideration of the process delay in the audio speed conversion circuit 1008' and the waiting time in the audio output buffer circuit 1009'.

(Embodiment 2)

Figure 7:
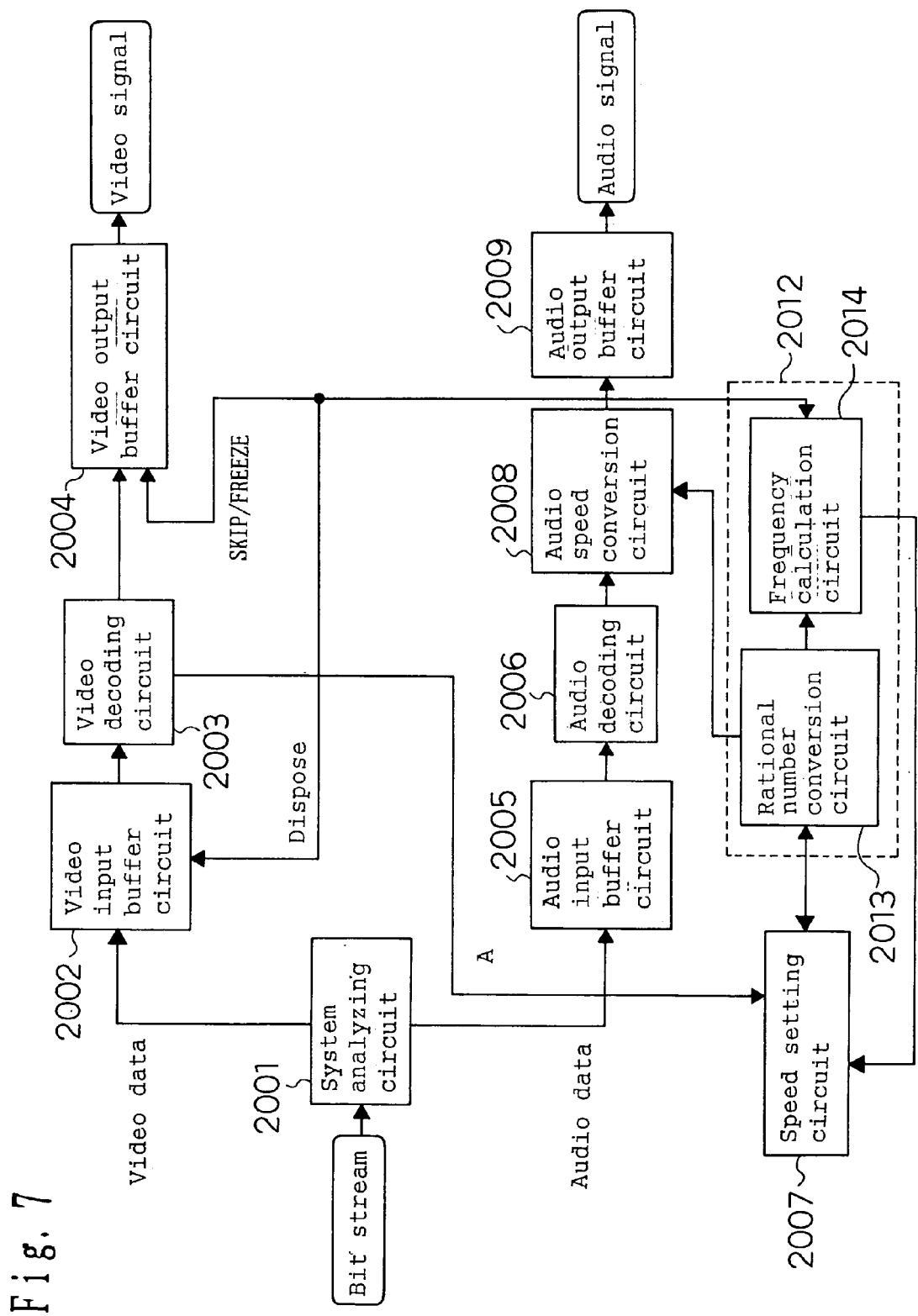
FIG. 7 is a block diagram of an audio video reproduction apparatus according to Embodiment 2 of an invention relevant to the present invention.

First, the configuration of an audio video reproduction apparatus according to the present embodiment is described below with reference mainly to FIG. 7 which is a block diagram of an audio video reproduction apparatus according to Embodiment 2 of an invention relevant to the present invention.

A system analyzing circuit 2001 is a circuit of classifying video data and audio data from input data.

A video input buffer circuit 2002 is a circuit of accumulating the video data outputted from the system analyzing circuit 2001, while a video decoding circuit 2003 is a circuit of acquiring the video data from the video input buffer circuit 2002 and thereby decoding and converting the data into a video signal.

A video output buffer circuit 2004 is a circuit of accumulating and outputting the video signal outputted from the video decoding circuit 2003.

An audio input buffer circuit 2005 is a circuit of accumulating the audio data outputted from the system analyzing circuit 2001, while an audio decoding circuit 2006 is a circuit of acquiring the audio data from the audio input buffer circuit 2005 and thereby decoding and converting the data into an audio signal.

A speed setting circuit 2007 is a circuit of setting a desired audio speed conversion ratio α (real number) in response to a user's instruction externally provided through a remote controller or the like.

A speed control circuit 2012 is a circuit comprising a rational number conversion circuit 2013 and a frequency calculation circuit 2014.

The rational number conversion circuit 2013 is a circuit of converting the value of the audio speed conversion ratio α outputted from the speed setting circuit 2007 into a rational number β in the vicinity of the value of the audio speed conversion ratio, and then outputting the rational number.

The frequency calculation circuit 2014 is a circuit which on the basis of the rational number β outputted from the rational number conversion circuit 2013, (1) controls the video output buffer circuit 2004 so that the video signal is frozen at a frequency based on the rational number β when the continuation time of the audio is to be extended, and (2) controls the video output buffer circuit 2004 so that the video signal (for example, a B picture which is of a type of video not referred to by the video decoding circuit 2003 during the decoding of another picture) is skip at a frequency based on the rational number β when the continuation time of the audio is to be reduced.

The frequency calculation circuit 2014 is a circuit of controlling the video input buffer circuit 2002 so that video data of B picture is disposed of at a frequency based on the rational number β in the latter case where the continuation time of the audio is to be reduced.

Such control permits more reliable synchronization between the audio signal outputted from the audio output buffer circuit 2009 and the video signal outputted from the video output buffer circuit 2004.

An audio speed conversion circuit 2008 has a configuration similar to that of the audio speed conversion circuit 1008, and hence is a circuit which using an audio speed conversion method of changing solely the continuation time without changing the frequency, performs an audio speed conversion process on the audio signal outputted from the audio decoding circuit 2006 on the basis of the rational number β outputted from the speed control circuit 2012.

An audio output buffer circuit 2009 is a circuit of accumulating the audio signal outputted from the audio speed conversion circuit 2008, and thereby outputting the audio signal continuously according to a sampling frequency.

Means including the system analyzing circuit 2001 corresponds to classifying means according to an invention relevant to the present invention. Means including the audio decoding circuit 2006 corresponds to audio signal generating means according to an invention relevant to the present invention. Means including the audio speed conversion circuit 2008 corresponds to audio speed converting means according to an invention relevant to the present invention. Means including the audio output buffer circuit 2009 corresponds to audio signal accumulating and outputting means according to an invention relevant to the present invention. Means including the video decoding circuit 2003 corresponds to video signal generating means according to an invention relevant to the present invention. Means including the video output buffer circuit 2004 corresponds to video signal accumulating and outputting means according to an invention relevant to the present invention. Means including the rational number conversion circuit 2013 corresponds to audio speed conversion ratio converting means according to an invention relevant to the present invention. Means including the video input buffer circuit 2002 corresponds to video data accumulating means according to an invention relevant to the present invention.

Figures 1, 8:
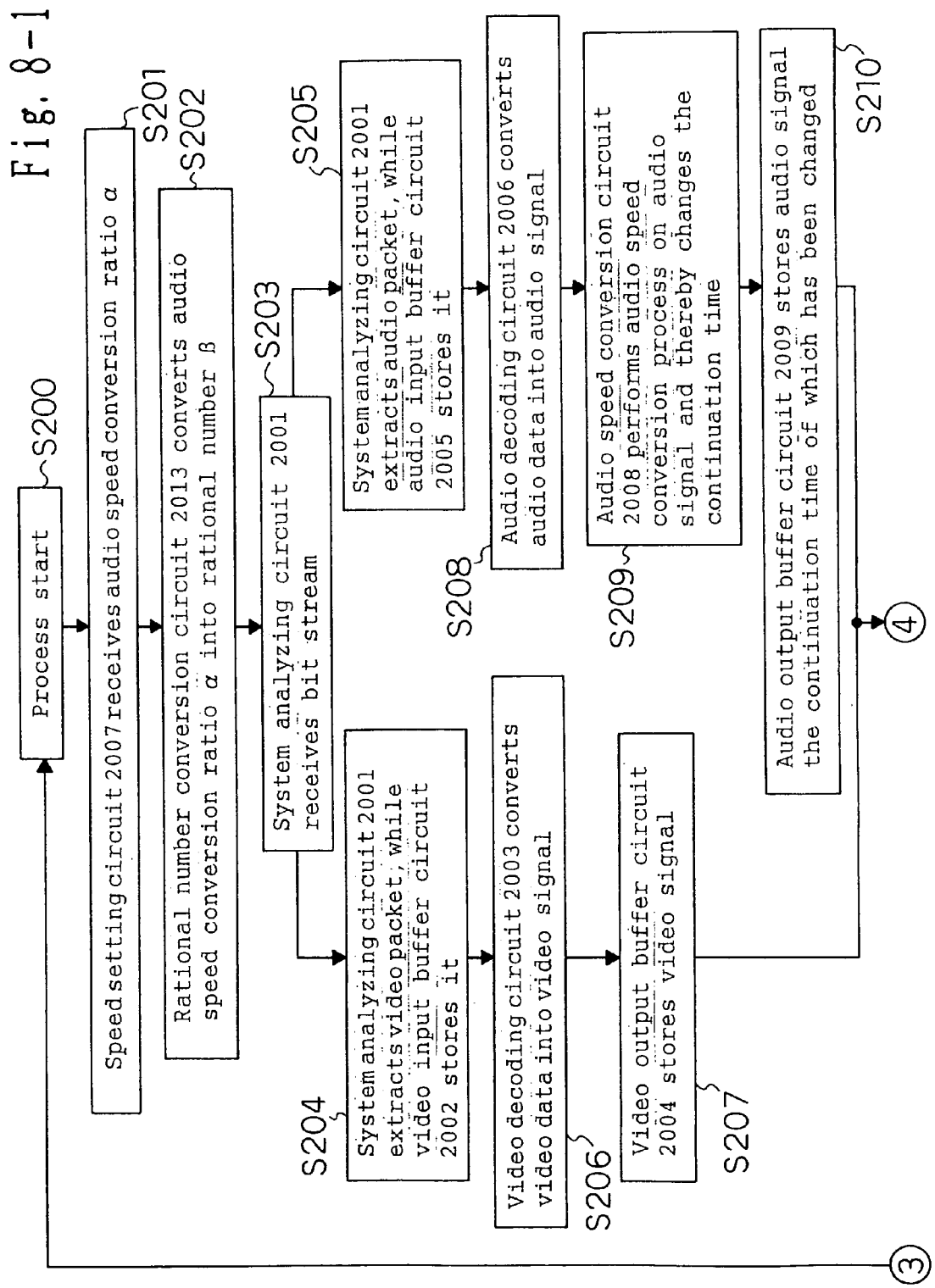

The operation of the audio video reproduction apparatus according to the present embodiment is described next with reference mainly to FIG. 8 which is a flowchart (Chart 1) of an audio video reproduction apparatus according to Embodiment 2 of an invention relevant to the present invention. At the same time as the description of the operation of the audio video reproduction apparatus according to the present embodiment, an embodiment of an audio video reproduction method according to an invention relevant to the present invention is also described.

Steps 200 and 201; The process begins (Step 200). The speed setting circuit 2007 receives an audio speed conversion ratio $\alpha$ ($0 < \alpha \leq 2$) (Step 201).

Step 202; The rational number conversion circuit 2013 converts the value of the audio speed conversion ratio $\alpha$ into a rational number $\beta$ in the vicinity of the value of the audio speed conversion ratio.

Step 203; The system analyzing circuit 2001 receives a bit stream

Step 204; The system analyzing circuit 2001 extracts a video packet from the bit stream. The video input buffer circuit 2002 stores it.

Step 205; The system analyzing circuit 2001 extracts an audio packet from the bit stream. The audio input buffer circuit 2005 stores it.

Steps 206 and 207; The video decoding circuit 2003 acquires the video data from the video input buffer circuit 2002, thereby decodes and converts the data into a video signal (Step 206).

The video output buffer circuit 2004 stores the video signal (Step 207).

Steps 208–210; The audio decoding circuit 2006 acquires the audio data from the audio input buffer circuit 2005, thereby decodes and converts the data into an audio signal (Step 208).

The audio speed conversion circuit 2008 performs an audio speed conversion process on the audio signal on the basis of the rational number $\beta$ converted by the rational number conversion circuit 2013, and thereby changes the continuation time (Step 209).

The audio output buffer circuit 2009 stores the audio signal the continuation time of which has been changed (Step 210).

Steps 211–217; The frequency calculation circuit 2014 determines the relation between the rational number $\beta$ and unity (Step 211).

(1) When it is determined that $0 < \beta < 1$ (that is, the reproduction speed is to be increased), the frequency calculation circuit 2014 calculates mutually-prime integers $m^{(1)}$ and $n^{(1)}$ ($1 \leq n^{(1)} < m^{(1)}$) which satisfy the relation $$1 - \beta = n^{(1)}/m^{(1)} \quad \text{(Equation 1)}$$

and integers $q^{(1)}$ and $r^{(1)}$ ($0 \leq r^{(1)} < n^{(1)}$) which satisfy the relation $$m^{(1)} = n^{(1)} q^{(1)} + r^{(1)} \quad \text{(Equation 2)}$$

and then calculates the partition $$m^{(1)} = \Sigma_j m^{(1)}_j \text{ (where } \Sigma \text{ is taken over the range } 1 \leq j \leq n^{(1)}) \quad \text{(Equation 4)}$$

of the integer $m^{(1)}$ by $n^{(1)}$ integers $m^{(1)}_j$ ($j=1, \ldots, n^{(1)}$) which satisfy the relations $$m^{(1)}_j = q^{(1)} \ (j=1, \ldots, n^{(1)}) \quad \text{(Equation 3)}$$

for $r^{(1)} = 0$, and $$m^{(1)}_j = q^{(1)} + 1 \ (j=1, \ldots, r)$$

$$m^{(1)}_j = q^{(1)} \ (j=r+1, \ldots, n^{(1)})$$

for $r^{(1)} \geq 1$ (Step 212). Using the stored video signal, the video output buffer circuit 2004 outputs the video signal with skipping one video frame in the first $m^{(1)}_1$ video frames, skipping one video frame in the next $m^{(1)}_2$ video frames, and so on (in total, $n^{(1)}$ video frames are skipped in $m^{(1)}$ video frames) (Step 213).

By virtue of the fine skipping by means of the partition of the integer $m^{(1)}$, more smooth dynamic picture reproduction is realized which does not cause unnatural feeling to the user, for example, in comparison with the case where the first $n^{(1)}$ video frames in $m^{(1)}$ video frames are skipped at one time.

Alternatively, the frequency calculation circuit 2014 controls the video input buffer circuit 2002 so that video data of B picture is disposed of (Step 214).

(2) When it is determined that $0 < \beta \leq 2$ (that is, the reproduction speed is to be reduced), the frequency calculation circuit 2014 calculates mutually-prime integers $m^{(2)}$ and $n^{(2)}$ ($1 \leq n^{(2)} \leq m^{(2)}$) which satisfy the relation $$\beta - 1 = n^{(2)}/m^{(2)} \quad \text{(Equation 5)}$$

and integers $q^{(2)}$ and $r^{(2)}$ ($0 \leq r^{(2)} < n^{(2)}$) which satisfy the relation $$m^{(2)} = n^{(2)} q^{(2)} + r^{(2)} \quad \text{(Equation 6)}$$

and then calculates the partition $$m^{(2)} = \Sigma_j m^{(2)}_j \text{ (where } \Sigma \text{ is taken over the range } 1 \leq j \leq n^{(2)}) \quad \text{(Equation 8)}$$

of the integer $m^{(2)}$ by $n^{(2)}$ integers $m^{(2)}_j$ ($j=1, \ldots, n^{(2)}$) which satisfy the relations $$m^{(2)}_j = q^{(2)} \ (j=1, \ldots, n^{(2)}) \quad \text{(Equation 7)}$$

for $r^{(2)} = 0$, and $$m^{(2)}_j = q^{(2)} + 1 \ (j=1, \ldots, r)$$

$$m^{(2)}_j = q^{(2)} \ (j=r+1, \ldots, n^{(2)})$$

for $r^{(2)} \geq 1$ (Step 215). Using the stored video signal, the video output buffer circuit 2004 outputs the video signal with freezing one video frame in the first $m^{(2)}_1$ video frames, freezing one video frame in the next $m^{(2)}_2$ video frames, and so on (in total, $n^{(2)}$ video frames are frozen in $m^{(2)}$ video frames) (Step 216).

By virtue of the fine skipping by means of the partition of the integer $m^{(2)}$, more smooth dynamic picture reproduction is realized which does not cause unnatural feeling to the user, for example, in comparison with the case where the first $n^{(2)}$ video frames in $m^{(2)}$ video frames are frozen at one time.

(3) When it is determined that $\beta = 1$ (that is, the reproduction speed is neither to be increased nor to be reduced), the frequency calculation circuit 2014 does not calculate anything further. Then, using the stored video signal, the video output buffer circuit 2004 outputs the video signal without skipping or freezing (Step 217).

Steps 218–220; The audio output buffer circuit 2009 outputs the audio signal (Step 218). (1) When the reproduction is to be ended, a series of these processes are terminated, whereas (2) when the reproduction is not to be ended, a series of these processes are repeated (Steps 219 and 220).

The configuration and the operation of the audio video reproduction apparatus according to the present embodiment have been described above in detail.

(A) Similarly to the above-mentioned Embodiment 1, in place of the control that the speed control circuit 2012 controls the video output buffer circuit 2004 so that the video signal (for example, B pictures) is skipped (or alternatively, along with the control that the video signal is skipped), the speed control circuit 2012 may notify this to the video input buffer circuit 2002, whereby on recognizing the notification, the video decoding circuit 2003 may identify and dispose of video data of the video signal (for example, B pictures) by itself.

That is, B pictures are identified from pictures of the other types, whereby the video signal of B picture solely is disposed of or skipped. This reduces the amount of processing in the video decoding circuit 2003 without problems during the decoding, and hence permits the reduction of the capacity of the video output buffer circuit 2004.

(B) Nevertheless, there is a case where the ratio p of the pictures other than B pictures to the entire pictures is excessively large in comparison with an audio speed conversion ratio $\alpha_0$ having been set externally (that is, the rational number $\beta_0$ converted from the audio speed conversion ratio $\alpha_0$). In such a case, the video signal of B picture could be insufficiently disposed of or skipped.

When this situation continues, the synchronization could be lost between the video signal and the audio signal. Further, overflow could occur in the video output buffer circuit 2004.

Thus, a control sequence of adjusting and maintaining the rational number $\beta$ within the range $\beta_0 \leq \beta \leq 1$ may be provided when necessary.

More specifically, the audio video reproduction apparatus according to the present embodiment may comprise the following audio speed conversion ratio adjusting mode as shown in FIG. 9 which is a flowchart (Chart 2) of an audio video reproduction apparatus according to Embodiment 2 of an invention relevant to the present invention.

Steps 501–506; The speed setting circuit 2007 determines the relation between the rational number $\beta$ converted from the present audio speed conversion ratio $\alpha_0$ and unity (Step 501).

The frequency calculation circuit 2014 (a) maintains present $\beta$ when it is determined that $\beta \geq 1$, and (b) determines whether the above-mentioned one video frame of B picture has successfully been skipped or not, when it is determined that $\beta < 1$ (Step 502).

(1) When it is determined that the skip has been unsuccessful, the speed setting circuit 2007 increases $\beta$ to make it approach unity (Step 503).

(2) When it is determined that the skip has been successful, the speed setting circuit 2007 determines whether $\beta = \beta_0$ or not (Step 504).

The speed setting circuit 2007 (a) maintains present $\beta$ when it is determined that $\beta = \beta_0$, and (b) determines the relation between the present ratio p of the pictures other than B pictures to the entire pictures and the rational number $\beta$ when it is determined that $\beta \neq \beta_0$ (Step 505), and thereby (b1) reduces $\beta$ to make it approach $\beta_0$ when it is determined that $p \leq \beta$ (that is, the ratio 1–p of B pictures is sufficiently large) (Step 506), (b2) and maintains present $\beta$ without reducing $\beta$ to make it approach $\beta_0$ when it is determined that $p > \beta$.

The detection of the ratio of the pictures other than B pictures to the entire pictures is described below in further detail.

With decoding the video data, the video decoding circuit 2003 identifies the video type described in the data of each picture of the video data. Then, the speed setting circuit 2007 acquires the accumulated number of each video type (I picture, P picture, and B picture), for example, within the preceding 1 second (30 frames in the NTSC scheme), and thereby calculates the ratio of the pictures other than B pictures to the entire pictures from the accumulated numbers according to (Equation 9).

$$A = (I\ picture + P\ picture)/(I\ picture + P\ picture + B\ picture) \quad \text{(Equation 9)}$$

When the obtained value A is larger than the audio speed conversion ratio $\alpha$ having been set, the speed setting circuit 2007 corrects the audio speed conversion ratio $\alpha$ having been set, into a value between A and unity. Then, when the value A recovers into a value smaller than the audio speed conversion ratio $\alpha_0$ having been set originally, the speed setting circuit 2007 re-sets the audio speed conversion ratio $\alpha$ into the audio speed conversion ratio $\alpha_0$.

(C) Of course, the adjustment of the rational number $\beta$ within the range $\beta_0 \leq \beta \leq 1$ may be an adjustment of the rational number $\beta$ so that $\beta = \beta_0$ or $\beta = 1$.

For example, when the relation $\beta = 1$ is set immediately in Step 503, the operation process of preventing the situation of $\beta > 1$ becomes unnecessary. Accordingly, even when the video signal contains no B picture, the synchronization error between the video signal and the audio signal and the overflow in the video output buffer circuit 2004 are easily avoided. Further, when the relation $\beta = \beta_0$ is set immediately in Step 506, the operation process of preventing the situation of $\beta < \beta_0$ becomes unnecessary. Accordingly, when the ratio p of the pictures other than B pictures to the entire pictures becomes small, the intrinsic audio speed conversion ratio is easily realized.

(D) Similarly to the above-mentioned Embodiment 1, when the video data contains a V-PTS and when the audio data contains an A-PTS, the V-PTS outputted from the video output buffer circuit 2004 may be compared with the A-PTS outputted from the audio output buffer circuit 2009, whereby the video frames accumulated in the video output buffer circuit 2004 may be further frozen or skipped.

As such, when the video frames are frozen or skipped on the basis of the comparison between the V-PTS and the A-PTS, synchronization (AV synchronization) between the video and the audio is realized which compensates synchronization errors between the video and the audio caused by reasons other than the audio speed conversion process (reasons caused by scratches or dust adhesion to the recording medium, difference between the decoding time of the video signal and the decoding time of the audio signal, and the like).

Figure 10:
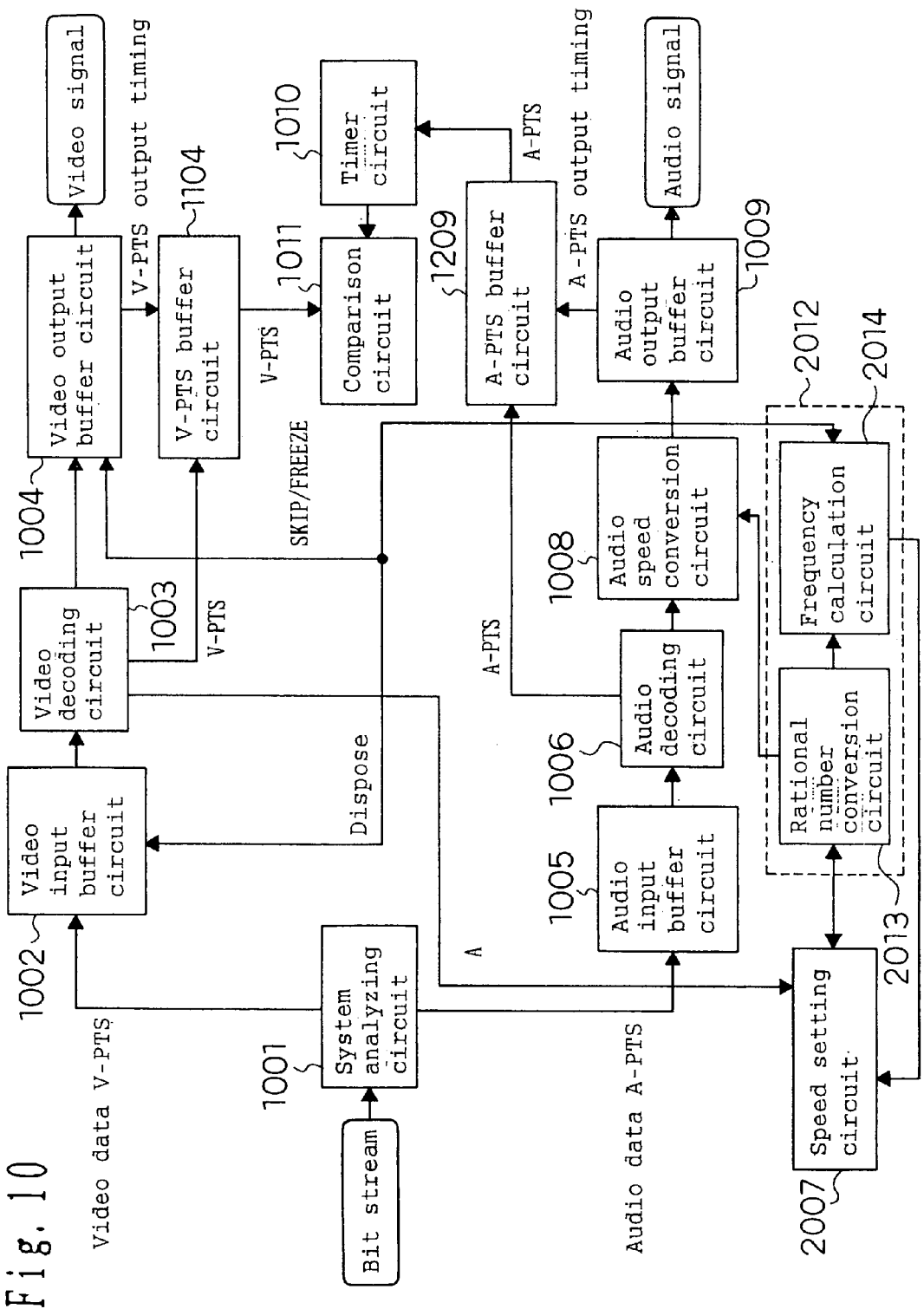
FIG. 10 is a block diagram of an audio video reproduction apparatus according to an embodiment of an invention relevant to the present invention.
Figure 11:
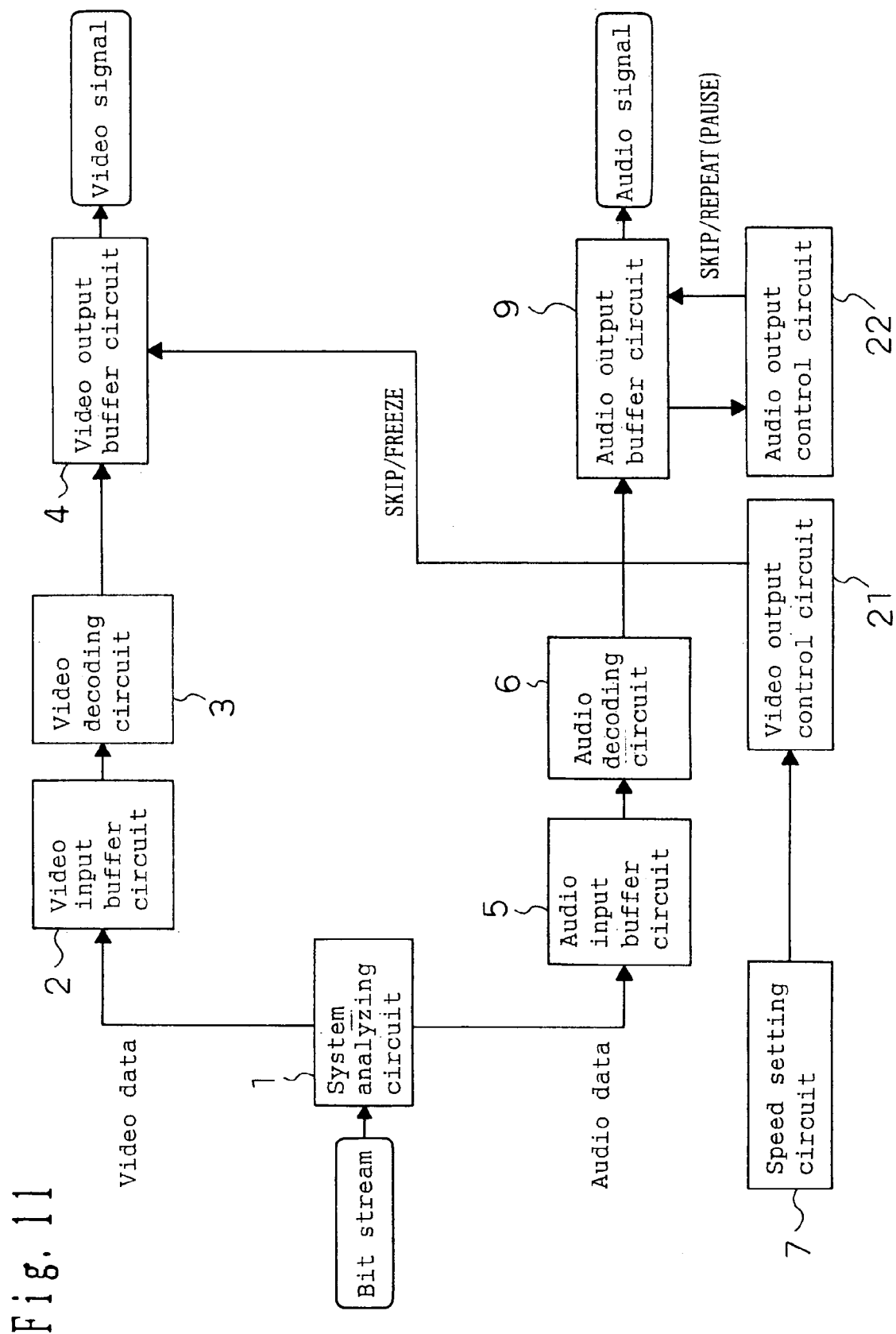
FIG. 11 is a block diagram of a prior art audio video reproduction apparatus.

More specifically, when the audio speed conversion process is performed according to the principle described in the above-mentioned Embodiment 2, with maintaining the synchronization between the video and the audio, synchronization errors maybe compensated between the video and the audio caused by reasons other than the audio speed conversion process, according to the principle described in the above-mentioned Embodiment 1. A specific example of an audio video reproduction apparatus having such a function is shown in FIG. 10 which is a block diagram of an audio video reproduction apparatus according to an embodiment of an invention relevant to the present invention.

A program according to the invention is a program which causes a computer to execute the function of all or part of the means (or apparatuses, devices, circuits, sections, and the like) in the above-mentioned audio video reproduction apparatus according to the invention, and works in cooperation with the computer. Further, a program according to the invention is a program which causes a computer to execute the operation of all or part of the steps (or processes, operations, effects, and the like) in the above-mentioned audio video reproduction method according to the invention, and works in cooperation with the computer.

A data structure according to the invention is a data structure used in all or part of the means and steps in the above-mentioned audio video reproduction apparatus and audio video reproduction method according to the invention, in cooperation with a computer.

A medium according to the invention is a medium which carries a program of causing a computer to execute all or part of the function of all or part of the means in the above-mentioned audio video reproduction apparatus according to the invention, wherein: the medium is read out by a computer; and the read-out program carries out the above-mentioned function in cooperation with the computer. Further, a medium according to the invention is a medium which carries a program of causing a computer to execute all or part of the operations of all or part of the steps in the above-mentioned audio video reproduction method according to the invention, wherein: the medium is read out by a computer; and the read-out program carries out the above-mentioned operation in cooperation with the computer. Furthermore, a medium according to the invention is a medium which carries a data structure used in all or part of the means and steps in the above-mentioned audio video reproduction apparatus and audio video reproduction method according to the invention, in cooperation with a computer, wherein: the medium is read out by a computer; and the read-out data structure is used in cooperation with the computer.

The above-mentioned "part of the means (or apparatuses, devices, circuits, sections, and the like)" according the invention and the above-mentioned "part of the steps (or processes, operations, effects, and the like)" according the invention indicate: a piece or pieces of means among a plurality of pieces of said means and a step or steps among a plurality of said steps; or alternatively, part of function in a piece of means and part of operation in a step, respectively.

A mode of use of a program according to the invention may be that the program is recorded in a computer-readable recording medium and works in cooperation with a computer. Further, a mode of use of a program according to the invention maybe that the program is transmitted through a transmitting medium, read out by a computer, and works in cooperation with the computer.

A data structure according to the invention includes a database, a data format, a data table, a data list, and a data type.

The scope of a medium according to the invention includes: a ROM; a transmitting medium such as the Internet; and a transmitting medium such as light, radio waves, and acoustic waves.

A computer according to the invention is not limited to genuine hardware such as a CPU, and may be firmware, an OS, and a peripheral device.

Further, as described above, the configuration of the invention may be implemented by software or hardware.

Described next are inventions which have been invented by the present inventor and which are the above-mentioned inventions relevant to the present invention.

A first aspect is an audio video reproduction apparatus comprising:

classifying means of classifying externally inputted MPEG (Moving Picture Experts Group) data containing audio data having an A-PTS (audio-presentation time stamp) and video data having a V-PTS (video-presentation time stamp) into said audio data and said video data;

audio signal generating means of decoding said classified audio data and thereby generating an audio signal;

audio speed converting means of performing audio speed conversion on said generated audio signal in such a manner that the information on said A-PTS is maintained, depending on an executing reproduction speed which is determined on the basis of an external setting reproduction speed having been set externally and at which actual reproduction is performed;

audio signal accumulating and outputting means of accumulating said audio signal having undergone the audio speed conversion and of outputting said accumulated audio signal according to said executing reproduction speed;

video signal generating means of decoding said classified video data and thereby generating a video signal;

video signal accumulating and outputting means of accumulating said generated video signal and outputting said accumulated video signal; and comparing means of comparing said A-PTS corresponding to the audio signal outputted from said audio signal accumulating and outputting means with said V-PTS corresponding to the video signal outputted from said video signal accumulating and outputting means, by using said maintained information on the A-PTS; wherein using the result of said comparison, said video signal accumulating and outputting means outputs said accumulated video signal according to said executing reproduction speed.

A second aspect is an audio video reproduction apparatus according to the first aspect, wherein as a result of said comparison, said video signal accumulating and outputting means (1) outputs said accumulated video signal with using skip operation when said A-PTS corresponding to the audio signal outputted from said audio signal accumulating and outputting means is in advance of said V-PTS corresponding to the video signal outputted from said video signal accumulating and outputting means, and (2) outputs said accumulated video signal with using freeze operation when said A-PTS corresponding to the audio signal outputted from said audio signal accumulating and outputting means is behind said V-PTS corresponding to the video signal outputted from said video signal accumulating and outputting means.

A third aspect is an audio video reproduction apparatus according to the second aspect, wherein as a result of said comparison, when said A-PTS corresponding to the audio signal outputted from said audio signal accumulating and outputting means is in advance of said V-PTS corresponding to the video signal outputted from said video signal accumulating and outputting means, said video signal accumulating and outputting means skips all or part of B pictures of said accumulated video signal.

A fourth aspect is an audio video reproduction apparatus according to the first aspect, further comprising video data accumulating means which is inserted between said classifying means and said video signal generating means and which accumulates said classified video data, wherein as a result of said comparison, when said A-PTS corresponding to the audio signal outputted from said audio signal accumulating and outputting means is in advance of said V-PTS corresponding to the video signal outputted from said video signal accumulating and outputting means, said video data accumulating means disposes of all or part of B pictures of said classified video data.

A fifth aspect is an audio video reproduction apparatus according to the first aspect, wherein said executing reproduction speed is (1) adjusted depending on whether said accumulated video signal has successfully been outputted according to said executing reproduction speed or not, alternatively (2) adjusted to approach the single speed when said accumulated video signal has not successfully been outputted according to said executing reproduction speed, and adjusted to approach said external setting reproduction speed when said accumulated video signal has successfully been outputted according to said executing reproduction speed, or alternatively (3) adjusted on the basis of the frequency of B pictures in said video data.

a sixth aspect is an audio video reproduction method comprising:

a classifying step of classifying externally inputted MPEG (Moving Picture Experts Group) data containing audio data having an A-PTS (audio-presentation time stamp) and video data having a V-PTS (video-presentation time stamp) into said audio data and said video data;

an audio signal generating step of decoding said classified audio data and thereby generating an audio signal;

an audio speed converting step of performing audio speed conversion on said generated audio signal in such a manner that the information on said A-PTS is maintained, depending on an executing reproduction speed which is determined on the basis of an external setting reproduction speed having been set externally and at which actual reproduction is performed;

an audio signal accumulating and outputting step of accumulating said audio signal having undergone the audio speed conversion and of outputting said accumulated audio signal according to said executing reproduction speed;

a video signal generating step of decoding said classified video data and thereby generating a video signal;

a video signal accumulating and outputting step of accumulating said generated video signal and outputting said accumulated video signal; and a comparing step of comparing said A-PTS corresponding to the audio signal outputted in said audio signal accumulating and outputting step with said V-PTS corresponding to the video signal outputted in said video signal accumulating and outputting step, by using said maintained information on the A-PTS; wherein in said video signal accumulating and outputting step, using the result of said comparison, said accumulated video signal is outputted according to said executing reproduction speed.

A seventh aspect is a program of causing a computer to execute the classifying step, the audio signal generating step, the audio speed converting step, the audio signal accumulating and outputting step, the video signal generating step, the video signal accumulating and outputting step, and the comparing step of the audio video reproduction method according to the sixth aspect.

A eighth aspect is a computer-processable medium which carries the program according to the seventh aspect.

A ninth aspect is an audio video reproduction apparatus comprising:

classifying means of classifying externally inputted MPEG (Moving Picture Experts Group) data containing audio data having an A-PTS (audio-presentation time stamp) and video data having a V-PTS (video-presentation time stamp), into said audio data and said video data;

audio signal generating means of decoding said classified audio data and thereby generating an audio signal;

audio speed converting means of performing predetermined audio speed conversion on said generated audio signal depending on an executing reproduction speed which is determined on the basis of an external setting reproduction speed having been set externally and at which actual reproduction is performed;

delay information generating means of generating predetermined delay information used for outputting said A-PTS obtained by the decoding of said audio data, according to said executing reproduction speed;

audio signal accumulating and outputting means of accumulating said audio signal having undergone the audio speed conversion and of outputting said accumulated audio signal according to said executing reproduction speed;

video signal generating means of decoding said classified video data and thereby generating a video signal;

video signal accumulating and outputting means of accumulating said generated video signal and outputting said accumulated video signal; and comparing means of comparing said A-PTS corresponding to the audio signal outputted from said audio signal accumulating and outputting means with said V-PTS corresponding to the video signal outputted from said video signal accumulating and outputting means, by using said generated predetermined delay information; wherein using the result of said comparison, said video signal accumulating and outputting means outputs said accumulated video signal according to said executing reproduction speed.

A tenth aspect is an audio video reproduction method comprising:

a classifying step of classifying externally inputted MPEG (Moving Picture Experts Group) data containing audio data having an A-PTS (audio-presentation time stamp) and video data having a V-PTS (video-presentation time stamp) into said audio data and said video data;

an audio signal generating step of decoding said classified audio data and thereby generating an audio signal;

an audio speed converting step of performing predetermined audio speed conversion on said generated audio signal depending on an executing reproduction speed which is determined on the basis of an external setting reproduction speed having been set externally and at which actual reproduction is performed;

a delay information generating step of generating predetermined delay information used for outputting said A-PTS obtained by the decoding of said audio data, according to said executing reproduction speed;

an audio signal accumulating and outputting step of accumulating said audio signal having undergone the audio speed conversion and of outputting said accumulated audio signal according to said executing reproduction speed;

a video signal generating step of decoding said classified video data and thereby generating a video signal;

a video signal accumulating and outputting step of accumulating said generated video signal and outputting said accumulated video signal; and a comparing step of comparing said A-PTS corresponding to the audio signal outputted from said audio signal accumulating and outputting means with said V-PTS corresponding to the video signal outputted from said video signal accumulating and outputting means, by using said generated predetermined delay information; wherein in said video signal accumulating and outputting step, using the result of said comparison, said accumulated video signal is outputted according to said executing reproduction speed.

An eleventh aspect is a program of causing a computer to execute the classifying step, the audio signal generating step, the audio speed converting step, the delay information generating step, the audio signal accumulating and outputting step, the video signal generating step, the video signal accumulating and outputting step, and the comparing step of the audio video reproduction method according to the tenth aspect.

A twelfth aspect is a computer-processable medium which carries the program according to the eleventh aspect.

A thirteenth aspect is an audio video reproduction apparatus comprising:

classifying means of classifying externally inputted MPEG (Moving Picture Experts Group) data containing audio data and video data, into said audio data and said video data;

audio signal generating means of decoding said classified audio data and thereby generating an audio signal;

audio speed converting means of performing predetermined audio speed conversion on said generated audio signal depending on an executing reproduction speed which is determined on the basis of an external setting reproduction speed having been set externally and at which actual reproduction is performed;

audio signal accumulating and outputting means of accumulating said audio signal having undergone the audio speed conversion and of outputting said accumulated audio signal according to said executing reproduction speed;

video signal generating means of decoding said classified video data and thereby generating a video signal; and video signal accumulating and outputting means of accumulating said generated video signal and outputting said accumulated video signal according to said executing reproduction speed.

A fourteenth aspect is an audio video reproduction apparatus according to the thirteenth aspect, further comprising audio speed conversion ratio converting means of converting an audio speed conversion ratio $\alpha$ of said generated audio signal relevant to said external setting reproduction speed into a rational number $\beta$ relevant to said executing reproduction speed, wherein:

said audio speed conversion ratio converting means performs said predetermined audio speed conversion on said generated audio signal depending on said rational number $\beta$;

said audio signal accumulating and outputting means accumulates said audio signal having undergone said audio speed conversion and outputs said accumulated audio signal according to said executing reproduction speed on the basis of said rational number $\beta$; and said video signal accumulating and outputting means accumulates said generated video signal and outputs said accumulated video signal according to said executing reproduction speed on the basis of said rational number $\beta$.

A fifteenth aspect is an audio video reproduction apparatus according to the fourteenth aspect, wherein said video signal accumulating and outputting means (1) outputs said accumulated video signal with using skip operation when said rational number $\beta$ is smaller than unity, and (2) outputs said accumulated video signal with using freeze operation when said rational number $\beta$ is larger than unity.

A sixteenth aspect is an audio video reproduction apparatus according to the fifteenth aspect, wherein said video signal accumulating and outputting means skips all or part of B pictures of said accumulated video signal when said rational number $\beta$ is smaller than unity.

A seventeenth aspect is an audio video reproduction apparatus according to the fourteenth aspect, further comprising video data accumulating means which is inserted between said classifying means and said video signal generating means and which accumulates said classified video data, wherein when said rational number $\beta$ is smaller than unity, said video data accumulating means disposes of all or part of B pictures of said classified video data.

An eighteenth aspect is an audio video reproduction apparatus according to the fourteenth aspect, wherein said executing reproduction speed is (1) adjusted depending on whether said accumulated video signal has successfully been outputted according to said executing reproduction speed or not, alternatively (2) adjusted to approach the single speed when said accumulated video signal has not successfully been outputted according to said executing reproduction speed, and adjusted to approach said external setting reproduction speed when said accumulated video signal has successfully been outputted according to said executing reproduction speed, or alternatively (3) adjusted on the basis of the frequency of B pictures in said video data.

A nineteenth aspect is an audio video reproduction apparatus according to the fifteenth aspect, wherein: (1) when said rational number $\beta$ is smaller than unity, using the partition $m^{(1)} = \Sigma_j m^{(1)}_j$ (where $\Sigma$ is taken over the range $1 \leq j \leq n^{(1)}$) (Equation 4)

of an integer $m^{(1)}$ by $n^{(1)}$ integers $m^{(1)}_j$ ($j=1, 2, \ldots, n^{(1)}$) which is determined according to a predetermined criterion with integers $m^{(1)}$ and $n^{(1)}$ ($1 \leq n^{(1)} < m^{(1)}$) which satisfy the relation $1 - \beta = n^{(1)}/m^{(1)}$ (Equation 1)

said video signal accumulating and outputting means outputs said accumulated video signal with skipping one video frame in the first $m^{(1)}_1$ video frames, skipping one video frame in the next $m^{(1)}_2$ video frames, and so on; and (2) when said rational number $\beta$ is larger than unity, using the partition $m^{(2)} = \Sigma_j m^{(2)}_j$ (where $\Sigma$ is taken over the range $1 \leq j \leq n^{(2)}$) (Equation 8)

of an integer $m^{(2)}$ by $n^{(2)}$ integers $m^{(2)}_j$ ($j=1, 2, \ldots, n^{(2)}$) which is determined according to a predetermined criterion with integers $m^{(2)}$ and $n^{(2)}$ ($1 \leq n^{(2)} < m^{(2)}$) which satisfy the relation $\beta - 1 = n^{(2)}/m^{(2)}$ (Equation 5)

said video signal accumulating and outputting means outputs said accumulated video signal with freezing one video frame in the first $m^{(2)}_1$ video frames, freezing one video frame in the next $m^{(2)}_2$ video frames, and so on.

A twentieth aspect is an audio video reproduction apparatus according to the nineteenth aspect, wherein: (1) said $n^{(1)}$ integers $m^{(1)}_j$ ($j=1, 2, \ldots, n^{(1)}$) indicate $n^{(1)}$ integers $m^{(1)}_j$ ($j=1, 2, \ldots, n^{(1)}$) which are determined using integers $q^{(1)}$ and $r^{(1)}$ ($0 \leq r^{(1)} < n^{(1)}$) satisfying the relation $m^{(1)} = n^{(1)} q^{(1)} + r^{(1)}$ (Equation 2)

and which are determined such that the relations $m^{(1)}_j = q^{(1)}$ ($j=1, \ldots, n^{(1)}$) (Equation 3)

for $r^{(1)} = 0$, and $m^{(1)}_j = q^{(1)} + 1$ ($j=1, \ldots, r$)

$m^{(1)}_j = q^{(1)}$ ($j=r+1, \ldots, n^{(1)}$)

for $r^{(1)} \geq 1$ are satisfied; and (2) said $n^{(2)}$ integers $m^{(2)}_j$ (j=1, 2, . . . , $n^{(2)}$) indicate $n^{(2)}$ integers $m^{(2)}_j$ (j=1, 2, . . . , $n^{(2)}$) which are determined using integers $q^{(2)}$ and $r^{(2)}$ ($0 \leq r^{(2)} < n^{(2)}$) satisfying the relation $$m^{(2)} = n^{(2)} q^{(2)} + r^{(2)} \quad \text{(Equation 6)}$$

and which are determined such that the relations $$m^{(2)} = q^{(2)} \ (j=1, \ldots, n^{(2)}) \quad \text{(Equation 7)}$$

for $r^{(2)} = 0$, and $$m^{(2)}_j = q^{(2)} + 1 \ (j=1, \ldots, r)$$

$$m^{(2)}_j = q^{(2)} \ (j=r+1, \ldots, n^{(2)})$$

for $r^{(2)} \geq 1$ are satisfied.

A twenty-first aspect is an audio video reproduction method comprising:

a classifying step of classifying externally inputted MPEG (Moving Picture Experts Group) data containing audio data and video data, into said audio data and said video data;

an audio signal generating step of decoding said classified audio data and thereby generating an audio signal;

an audio speed converting step of performing predetermined audio speed conversion on said generated audio signal depending on an executing reproduction speed which is determined on the basis of an external setting reproduction speed having been set externally and at which actual reproduction is performed;

an audio signal accumulating and outputting step of accumulating said audio signal having undergone the audio speed conversion and of outputting said accumulated audio signal according to said executing reproduction speed;

a video signal generating step of decoding said classified video data and thereby generating a video signal; and a video signal accumulating and outputting step of accumulating said generated video signal and outputting said accumulated video signal according to said executing reproduction speed.

A twenty-second aspect is a program of causing a computer to execute the classifying step, the audio signal generating step, the audio speed converting step, the audio signal accumulating and outputting step, the video signal generating step, and the video signal accumulating and outputting step of the audio video reproduction method according to the twenty-first aspect.

A twenty-third aspect is a computer-processable medium which carries the program according to the twenty-second aspect.

As seen from the above-mentioned description, the invention has the advantage that even when reproduction speed is set different from the normal reproduction speed, the output timing of the video signal and the output timing of the audio signal do not largely deviate from each other in comparison with the case of normal reproduction, and hence their synchronization is maintained more precisely.

What is claimed is:

1. An audio video reproduction apparatus comprising:
a classifying unit for classifying inputted MPEG (Moving Picture Experts Group) data into audio data and video data, wherein said audio data has an audio-presentation time stamp and said video data has a video-presentation time stamp;

an audio signal generator for decoding said classified audio data to generate an audio signal and to output the audio-presentation time stamp contained in the audio data;

an audio speed converter for performing an audio speed conversion on said generated audio signal, said audio speed conversion corresponding to an executing reproduction speed, wherein said audio-presentation time stamp is maintained;

an audio signal buffer unit for storing said speed converted audio signal and for outputting said stored speed converted audio signal according to said executing reproduction speed;

an audio-presentation time stamp buffer unit for storing said audio-presentation time stamp and for outputting said audio-presentation time stamp in synchronization with said speed converted audio signal outputted according to said executing reproduction speed;

a video signal generator for decoding said classified video data to generate a video signal;

a video signal buffer unit for storing said generated video signal and for outputting said stored video signal; and a comparing unit for comparing said audio-presentation time stamp outputted from said audio-presentation time stamp buffer unit corresponding to the audio signal outputted from said audio signal buffer unit with said video-presentation time stamp, wherein said video signal buffer unit outputs said video signal according to a result of said comparison and said executing reproduction speed.

2. An audio video reproduction apparatus according to claim 1, wherein as a result of said comparison, said video signal buffer unit (1) outputs said accumulated video signal with using skip operation when said audio-presentation time stamp corresponding to the audio signal outputted from said audio signal buffer unit is in advance of said video-presentation time stamp corresponding to the video signal outputted from said video signal buffer unit, and (2) outputs said accumulated video signal with using freeze operation when said audio-presentation time stamp corresponding to the audio signal outputted from said audio signal buffer unit is behind said video-presentation time stamp corresponding to the video signal outputted from said video signal buffer unit.

3. An audio video reproduction apparatus according to claim 2, wherein as a result of said comparison, when said audio-presentation time stamp corresponding to the audio signal outputted from said audio signal buffer unit is in advance of said video-presentation time stamp corresponding to the video signal outputted from said video signal buffer unit, said video signal buffer unit skips all or part of B pictures of said accumulated video signal.

4. An audio video reproduction apparatus according to claim 1, further comprising a video data accumulator which is inserted between said classifying unit and said video signal generator and which accumulates said classified video data, wherein as a result of said comparison, when said audio-presentation time stamp corresponding to the audio signal outputted from said audio signal buffer unit is in advance of said video-presentation time stamp corresponding to the video signal outputted from said video signal buffer unit, said video data accumulator disposes of all or part of B pictures of said classified video data.

5. An audio video reproduction apparatus according to claim 1, wherein said executing reproduction speed is (1) adjusted depending on whether said stored video signal has successfully been outputted according to said executing reproduction speed or not, alternatively (2) adjusted to approach the single speed when said stored video signal has not successfully been outputted according to said executing reproduction speed, and adjusted to approach said external setting reproduction speed when said stored video signal has successfully been outputted according to said executing reproduction speed, or alternatively (3) adjusted on the basis of the frequency of B pictures in said video data.

6. An audio video reproduction apparatus comprising:
a classifying unit for classifying externally inputted MPEG (Moving Picture Experts Group) data, into audio data and video data;
an audio signal generator for decoding said classified audio data to generate an audio signal;
an audio speed converter for performing an audio speed conversion on said generated audio signal, said audio speed conversion corresponding to an executing reproduction speed;
an audio signal buffer unit for storing said speed converted audio signal and for outputting said stored speed converted audio signal according to said executing reproduction speed;
a video signal generator for decoding said classified video data to generate a video signal;
a video signal buffer unit for storing said generated video signal and for outputting said stored video signal; and
an audio speed conversion ratio converter for converting an audio speed conversion ratio $\alpha$ of said generated audio signal relevant to said external setting reproduction speed into a rational number $\beta$ relevant to said executing reproduction speed,
wherein said audio speed conversion ratio converter performs said predetermined audio speed conversion on said generated audio signal depending on said rational number $\beta$;
said audio signal buffer unit accumulates said audio signal having undergone said audio speed conversion and outputs said accumulated audio signal; and
said video signal buffer unit accumulates said generated video signal and outputs said accumulated video signal according to said executing reproduction speed on the basis of said rational number $\beta$.

7. An audio video reproduction apparatus according to claim 6, wherein said video signal buffer unit (1) outputs said accumulated video signal with using skip operation when said rational number $\beta$ is smaller than unity, and (2) outputs said accumulated video signal with using freeze operation when said rational number $\beta$ is larger than unity.

8. An audio video reproduction apparatus according to claim 7, wherein said video signal buffer unit skips all or part of B pictures of said accumulated video signal when said rational number $\beta$ is smaller than unity.

9. An audio video reproduction apparatus according to claim 6, further comprising a video data buffer unit which is inserted between said classifying unit and said video signal generator and which accumulates said classified video data, wherein
when said rational number $\beta$ is smaller than unity, said video data disposes of all or part of B pictures of said classified video data.

10. An audio video reproduction apparatus according to claim 6, wherein said executing reproduction speed is (1) adjusted depending on whether said accumulated video signal has successfully been outputted according to said executing reproduction speed or not, alternatively (2) adjusted to approach the single speed when said accumulated video signal has not successfully been outputted according to said executing reproduction speed, and adjusted to approach said external setting reproduction speed when said accumulated video signal has successfully been outputted according to said executing reproduction speed, or alternatively (3) adjusted on the basis of the frequency of B pictures in said video data.

11. An audio video reproduction apparatus according to claim 7, wherein: (1) when said rational number $\beta$ is smaller than unity, using the partition $$m^{(1)} = \Sigma_j m^{(1)}_j \text{ (where } \Sigma \text{ is taken over the range} \quad \text{(Equation 4)}$$
$$1 \leq j \leq n^{(1)}$$

of an integer $m^{(1)}$ by $n^{(1)}$ integers $m^{(1)}_j$ ($j=1, 2, \ldots, n^{(1)}$) which is determined according to a predetermined criterion with integers $m^{(1)}$ and $n^{(1)}$ ($1 \leq n^{(1)} \leq m^{(1)}$) which satisfy the relation $$1 - \beta = n^{(1)}/m^{(1)} \quad \text{(Equation 1)}$$

said video signal buffer unit outputs said accumulated video signal with skipping one video frame in the first $m^{(1)}_1$ video frames, skipping one video frame in the next $m^{(1)}_2$ video frames, and so on; and (2) when said rational number $\beta$ is larger than unity, using the partition $$m^{(2)} = \Sigma_j m^{(2)}_j \text{ (where } \Sigma \text{ is taken over the range} \quad \text{(Equation 8)}$$
$$1 \leq j \leq n^{(2)}$$

of an integer $m^{(2)}$ by $n^{(2)}$ integers $m^{(2)}_j$ ($j=1, 2, \ldots, n^{(2)}$) which is determined according to a predetermined criterion with integers $m^{(2)}$ and $n^{(2)}$ ($1 \leq n^{(2)} \leq m^{(2)}$) which satisfy the relation $$\beta - 1 = n^{(2)}/m^{(2)} \quad \text{(Equation 5)}$$

said video signal buffer unit outputs said accumulated video signal with freezing one video frame in the first $m^{(2)}_1$ video frames, freezing one video frame in the next $m^{(2)}_2$ video frames, and so on.

12. An audio video reproduction apparatus according to claim 11, wherein: (1) said $n^{(1)}$ integers $m^{(1)}_j$ ($j=1, 2, \ldots, n^{(1)}$) indicate $n^{(1)}$ integers $m^{(1)}_j$ ($j=1, 2, \ldots, n^{(1)}$) which are determined using integers $q^{(1)}$ and $r^{(1)}$ ($0 \leq r^{(1)} < n^{(1)}$) satisfying the relation $$m^{(1)} = n^{(1)} q^{(1)} + r^{(1)} \quad \text{(Equation 2)}$$

and which are determined such that the relations $$m^{(1)}_j = q^{(1)} \ (j=1, \ldots, n^{(1)}) \quad \text{(Equation 3)}$$

for $r^{(1)} = 0$, and $$m^{(1)}_j = q^{(1)} + 1 \ (j=1, \ldots, r^{(1)})$$

$$m^{(1)}_j = q^{(1)} \ (j=r^{(1)}+1, \ldots, n^{(1)})$$

for $r^{(1)} \geq 1$
are satisfied; and (2) said $n^{(2)}$ integers $m^{(2)}_j$ ($j=1, 2, \ldots, n^{(2)}$) indicate $n^{(2)}$ integers $m^{(2)}_j$ ($j=1, 2, \ldots, n^{(2)}$) which are determined using integers $q^{(2)}$ and $r^{(2)}$ ($0 \leq r^{(2)} < n^{(2)}$) satisfying the relation $$m^{(2)} = n^{(2)} q^{(2)} + r^{(2)} \quad \text{(Equation 6)}$$

and which are determined such that the relations $$m^{(2)}_j = q^{(2)} \ (j=1, \ldots, n^{(2)}) \quad \text{(Equation 7)}$$

for $r^{(2)} = 0$, and $$m^{(2)}_j = q^{(2)} + 1 \ (j=1, \ldots, r^{(2)})$$

$$m^{(2)}_j = q^{(2)} \ (j=r^{(2)}+1, \ldots, n^{(2)})$$

for $r^{(2)} \geq 1$ are satisfied.

* * * * *